(12) United States Patent
Christiansen

(10) Patent No.: US 10,877,509 B2
(45) Date of Patent: Dec. 29, 2020

(54) COMMUNICATING SIGNALS BETWEEN DIVIDED AND UNDIVIDED CLOCK DOMAINS

(71) Applicant: Intel Corporation, Santa Clara, CA (US)

(72) Inventor: Ammon J. Christiansen, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 589 days.

(21) Appl. No.: 15/375,344

(22) Filed: Dec. 12, 2016

(65) Prior Publication Data
US 2018/0164845 A1   Jun. 14, 2018

(51) Int. Cl.
*G06F 1/08* (2006.01)
*G06F 1/12* (2006.01)
*G06F 5/14* (2006.01)
*G06F 13/42* (2006.01)
*G06F 5/10* (2006.01)

(52) U.S. Cl.
CPC .............. *G06F 1/08* (2013.01); *G06F 1/12* (2013.01); *G06F 5/10* (2013.01); *G06F 5/14* (2013.01); *G06F 13/4295* (2013.01); *G06F 2205/126* (2013.01); *Y02D 10/00* (2018.01)

(58) Field of Classification Search
CPC ........................................................ G06F 1/08
See application file for complete search history.

(56) References Cited

U.S. PATENT DOCUMENTS

| | | | |
|---|---|---|---|
| 6,772,280 B1* | 8/2004 | Kamijo | G06F 5/10 710/57 |
| 7,007,187 B1* | 2/2006 | Wilcox | G06F 1/12 713/500 |
| 2006/0059286 A1 | 3/2006 | Bertone et al. | |
| 2008/0072127 A1* | 3/2008 | Chakraborty | H03M 13/4184 714/795 |
| 2008/0301708 A1* | 12/2008 | Hamilton | G06F 9/466 719/314 |
| 2013/0254583 A1 | 9/2013 | Rifani et al. | |
| 2014/0126303 A1 | 5/2014 | Mutchnik | |
| 2015/0055778 A1* | 2/2015 | Cox | H04L 9/0662 380/46 |
| 2016/0283398 A1* | 9/2016 | Abali | G06F 12/1018 |

OTHER PUBLICATIONS

European Patent Office; "Extended European Search Report"; Application No. 17206848.8-1221; dated Aug. 5, 2018; 7 pages.

* cited by examiner

*Primary Examiner* — Kim Huynh
*Assistant Examiner* — Joshua Neveln
(74) *Attorney, Agent, or Firm* — Trop, Pruner & Hu, P.C.

(57) ABSTRACT

A processor includes a plurality of processing cores; a frequency divider; and a synchronous first in first out (FIFO) buffer. The frequency divider frequency divides a first clock signal that is associated with a first clock domain to provide a second clock signal that is associated with a second clock domain. The synchronous FIFO buffer has a write port that is associated with the first clock domain and a read port that is associated with the second clock domain. The synchronous FIFO communicates the data between the first and second clock domains.

15 Claims, 19 Drawing Sheets

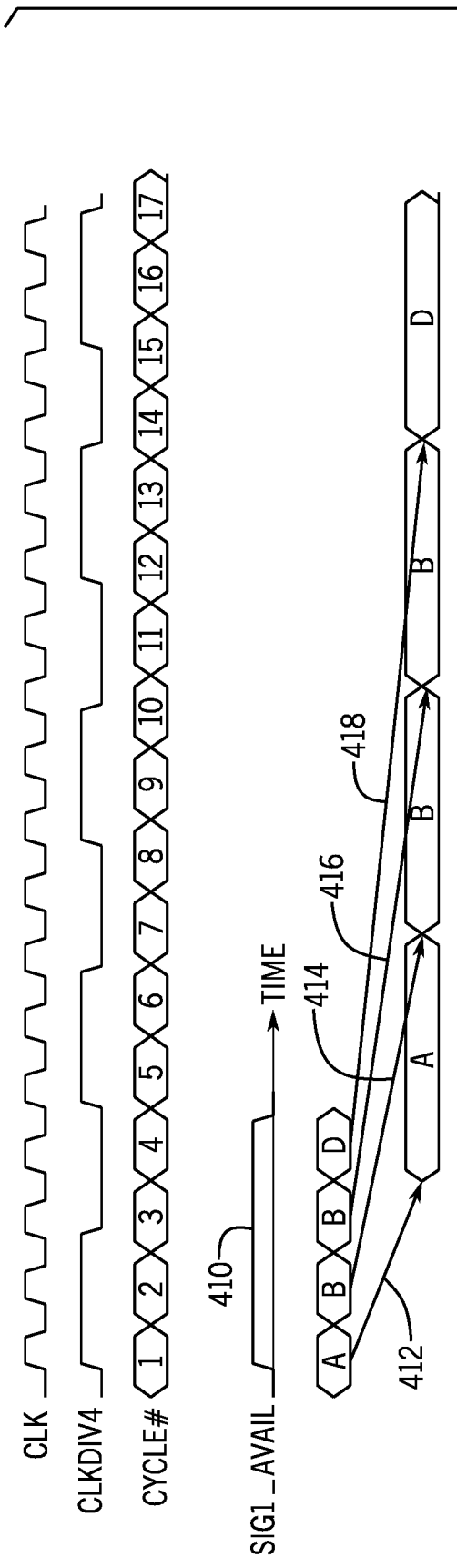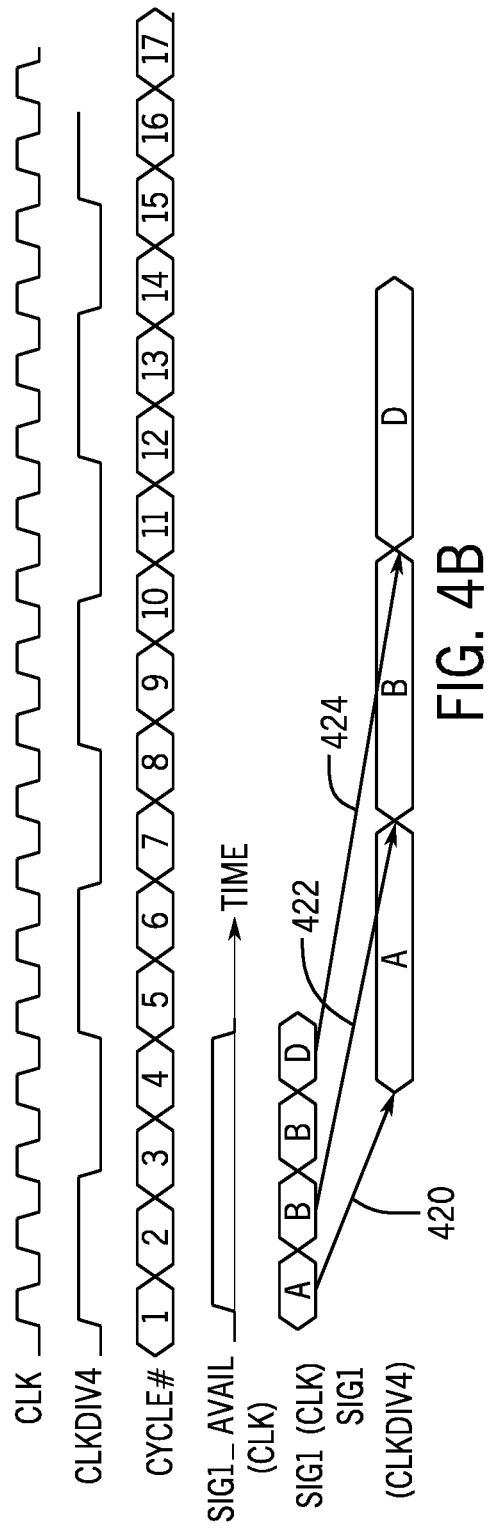
FIG. 4A
FIG. 4B

COMMUNICATING SIGNALS BETWEEN DIVIDED AND UNDIVIDED CLOCK DOMAINS

BACKGROUND

Clock signals may be used in an electronic system for such purposes as synchronizing the operations of processor cores, synchronizing the operation of logic, tracking time, initiating periodic activity, and so forth. The circuitry of a given electronic system may be partitioned into different clock domains, such that the operations of circuitry of a given clock domain are synchronous to certain edges (the rising, or positive going edges, for example) of an associated clock signal.

The clock signals that are associated with a given pair of clock domains may be independent of each other, as the clock signals may be generated by independent clock sources. The clock signals that are associated with a given pair of clock domains may be related, however. For example, the clock signals may have different frequencies, but clock edges (upgoing, or rising, edges, for example) of the lower frequency clock signal may be time-aligned with clock edges of the higher frequency clock signal. As a more specific example, the lower frequency clock signal may be generated by a frequency divider that frequency divides the higher frequency clock signal.

BRIEF DESCRIPTION OF THE DRAWINGS

FIG. 4A depicts waveforms associated with the transfer of data from an undivided clock domain to a divided clock domain when value change compression is not used according to an example implementation.

FIG. 4B depicts waveforms associated with the transfer data from an undivided clock domain to a divided clock domain when value change compression is used according to an example implementation.

DETAILED DESCRIPTION

Figure 1:
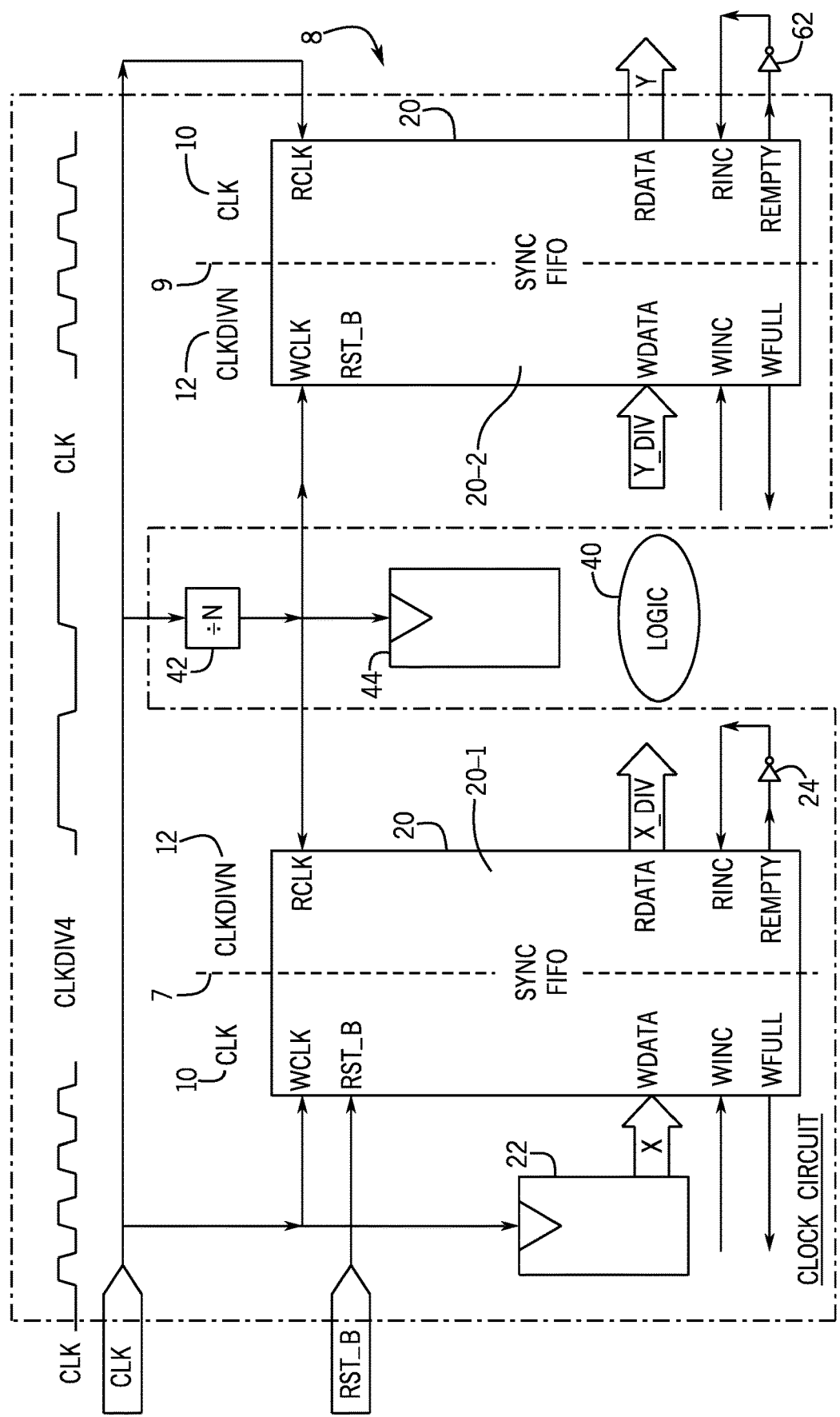
FIG. 1 is a schematic diagram of a clock circuit to communicate signals between clock domains according to an example implementation.

The following description describes circuitry to communicate signals between different clock domains (divided and undivided clock domains, for example) within or in associated with a processor, computer system, or other processing apparatus. In the following description, numerous specific details such as processing logic, processor types, microarchitectural conditions, events, enablement mechanisms, and the like are set forth in order to provide a more thorough understanding of example implementations. It will be appreciated, however, by one skilled in the art that the invention may be practiced without such specific details. Additionally, some well-known structures, circuits, and the like have not been shown in detail to avoid unnecessarily obscuring example implementations.

Although the following implementations are described with reference to a processor, other implementations are applicable to other types of integrated circuits and logic devices. Similar techniques and teachings of example implementations can be applied to other types of circuits or semiconductor devices that can benefit from higher pipeline throughput and improved performance. The teachings of example implementations are applicable to any processor or machine that performs data manipulations. However, the present invention is not limited to processors or machines that perform 512 bit, 256 bit, 128 bit, 64 bit, 32 bit, or 16 bit data operations and can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of example implementations rather than to provide an exhaustive list of all possible implementations of example implementations.

Alternatively, steps or acts may be performed by specific hardware components that contain fixed-function logic for performing the steps or acts, or by any combination of program computer components and fixed-function hardware components.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of example implementations.

Circuitry of a given electronic system may be partitioned into clock domains, with the circuitry in each of the clock domains being synchronous to an associated clock signal (synchronous to the rising, or positive going edges of the associated clock signal, for example). For example, a given computer system may have digital circuitry that is clocked by, or synchronous to, a relatively high frequency clock signal (a clock signal having a frequency of 2.5 GigaHertz (GHz), for example) and other digital circuitry that is synchronous to, or clocked by, relatively lower frequency clock signal (a clock signal having a frequency of 100 to 500 MegaHertz (MHz), for example). More specifically, the higher frequency digital circuitry may be associated with an undivided clock domain (i.e., a clock domain that is synchronous to the higher frequency clock signal), with the lower frequency digital circuit may be associated with a frequency divided clock domain (i.e., a clock domain that is synchronous to a clock signal that is produced by frequency dividing the higher frequency clock signal. The lower frequency digital circuitry may, for example, respond to regular events, which occur at a fraction of the higher frequency clock signal. Moreover, the lower frequency digital circuitry may be incapable of meeting the timing of the higher frequency clock signal.

The low and high frequency digital circuits do not operate in isolation; but rather, the lower frequency digital circuitry may perform operations that rely on data provided by the higher frequency digital circuitry as well as provide data that is furnished to the higher frequency digital circuitry. As such, signals representing data as well as control signals may be communicated between the undivided and divided clock domains. As a more specific example, the higher frequency digital circuitry may, for example, include processor core circuitry of a processor, and the lower frequency digital circuitry may include relatively slower logic, such as, for example, circuitry that serves as a physical entropy source, such as in a digital random number generator (DRNG). In general, the DRNG generates and provides random numbers for processor cores/threads.

More specifically, a given processor core or executing thread may generate a request for the DRNG to generate a deterministic or non-deterministic random number. In this manner, the request may be associated with data, such as, for example, data that identifies a particular processor register in which the random number is to be stored. In response to the request, the DRNG may generate a random number and provide a response that includes data (the generated random number) and an address of the appropriate processor register. By examining the register and a carry flag associated with the register, a given processor core/thread may determine whether the random number request has been processed and thus, whether the register contains a random number generated by the DRNG.

One solution to communicate signals between clock domains is to use one-off multi-cycle path overrides to add timing margin to the path based on spacing between enabled cycles of the higher frequency clock. However, this approach may be relatively challenging to develop, as it may be relatively challenging to validate, prove and review, and the approach may be prone to post-silicon escapes.

Another approach to communicate signals between clock domains is to use an asynchronous clock crossing first in first out (FIFO) buffer. As further described herein, however, this approach may introduce unnecessary latencies by assuming that the clock crossing is asynchronous if the clock signals that are associated with the two clock domains have a synchronous relationship.

Another approach to communicate signals between two clock domains that are multiplied from a common clock source is to use a bubble generating FIFO buffer. This approach may, however, invoke the use of complex circuiting thereby having an increased associated design/verification cost.

Referring to FIG. 1, in accordance with example implementations, a clock circuit 8 includes synchronous FIFO buffers 20-1 and 20-2 for purposes of communicating signals between a first clock domain 10 associated with a relatively faster undivided clock signal (called "CLK" herein) and a clock domain 12 associated with a relatively slower divided clock signal (called "CLKDIVN" herein). The transition from the clock domain 10 to the clock domain 12 is represented by a clock boundary 7, and the transition from the clock domain 12 to the clock domain 10 is represented by a clock boundary 9.

In accordance with example implementations, the CLKDIVN clock signal is provided by a frequency divider 42, which receives the CLK clock signal. For the specific example illustrated in connection with FIG. 1, the frequency divider 42 divides the frequency of the CLK clock signal by four, and positive, going, or rising, edges of the CLK clock signal (every fourth rising edge, for example) are synchronous to rising edges of the CLKDIVN clock signal. The frequency divider 42 may frequency divide by a modulus other than four, in accordance with further example implementations.

The synchronous FIFO buffers 20-1 and 20-2, in general, have the same design, thereby denoted by the common reference numeral "20." In general, the synchronous FIFO buffer 20-1 receives data (denoted by "X" in FIG. 1) in synchronization with the higher frequency undivided clock domain 10 and provides corresponding data (denoted by the "X_DIV" in FIG. 1) at its output, which is synchronous to the lower frequency, divided clock domain 12. In particular, the X_DIV data is received by logic 40, which processes the X_DIV data in synchronization with the CLKDIVN clock signal to produce corresponding output data (represented by "Y_DIV" in FIG. 1). The Y_DIV data, in turn, is received by the synchronous FIFO buffer 20-2, which transitions the Y_DIV data from the divided clock domain 12 back into the undivided clock domain 10 to produce corresponding output data (called "Y" in FIG. 1) that is synchronous to the CLK clock signal. As depicted in FIG. 1, the logic 40 may receive the CLKDIVN clock signal from a D-type flip-flop 44, as depicted in FIG. 1.

The synchronous FIFO buffer 20-1 has a write port that is synchronous to the CLK clock signal and a read port that is synchronous to the CLKDIVN clock signal. More specifically, for the write port, the synchronous FIFO buffer 20-1 has a WCLK write clock input, which receives the CLK clock signal; a WDATA input, which receives the X input data; and a WINC input, which allows rising edges on the input to increment a write pointer of the synchronous FIFO buffer 20. Moreover, for the write port, the synchronous FIFO buffer 20-1 has a WFULL output terminal, which is asserted (driven high, for example) by the FIFO buffer 20-1 for purposes of indicating when the FIFO buffer 20-1 is full (i.e., no more entries may be stored in the FIFO buffer 20-1 until one or more entries are read from the buffer 20-1).

For the read port, the synchronous FIFO buffer 20-1 has an RCLK input that receives the CLKDIVN clock signal for purposes of synchronizing the read port to the CLKDIVN clock signal; an RDATA input for purposes of furnishing the X_DIV data; a RINC input, for purposes of receiving a signal whose rising edge may be used to increment the read pointer of the synchronous FIFO buffer 20-1; and an REMPTY output, which is asserted (driven high, for example) for purposes of indicating that the synchronous FIFO buffer 20-1 is empty. As depicted in FIG. 1, in accordance with some implementations, an inverter 24 may be coupled between the REMPTY and RINC terminals of the synchronous FIFO buffer 20-1 for purposes of incrementing the read pointer as long as the synchronous FIFO buffer 20-1 is not empty.

The synchronous FIFO buffer 20-2 has a write port that is synchronous to the CLKDIVN clock signal and a read port that is synchronous to the CLK clock signal. In accordance with example implementations, the write port of the synchronous FIFO buffer 20-2 has a WCLK input that receives the CLKDIVN clock signal; a WDATA input that receives the Y_DIV data; a WINC input that receives a write pointer increment signal; and a WFULL output that is asserted (driven high, for example) when the synchronous FIFO buffer 20-2 is full. For its read port, the synchronous FIFO buffer 20-2 has an RCLK input that receives the CLK clock signal; an RDATA output that provides the Y data; an RINC input that receives the read pointer increment signal; and an REMPTY output that is asserted (driven high, for example) for purposes of indicating that the synchronous FIFO buffer 20-2 is empty. Moreover, as depicted in FIG. 1, in accordance with example implementations, an inverter 62 is coupled between the REMPTY output and the RINC input for purposes of incrementing the read pointer as long as the synchronous FIFO buffer 20-2 is not empty.

By communicating the control and data signals through the synchronous FIFO buffers 20-1 and 20-2 to cross the clock-divided boundaries 7 and 9, the logic 40 does not need to run as fast as the circuitry that is located in the higher frequency clock domain 10. The order of transitions is preserved, allowing interface protocols to work across the clock boundaries unimpeded. Thus, by using the clock circuit 8, it is easier to validate the timing than one-off multi-cycle path overrides, the various assertions required to prove such, and the work required to iterate with the static timing analysis (STA) tool to add all of the required multi-cycle path overrides (and validate each one). Moreover, the clock circuit 8 does not have the complexity of a clock circuit that uses asynchronous logic, and the clock circuit 8 is less complex and simpler in design than a bubble generating FIFO buffer. Additionally, the clock circuit 8 does not require a separate input clock for the lower frequency sub-design, as the divided version of the CLK clock signal is used based on a simple integer-ratio clock divider 42, in accordance with example implementations.

Among the possible advantages of the clock circuit 8 is that the dynamic power reduction may be reduced, as compared to alternate designs, because part of the clock circuit 8 operates at a reduced clock frequency. Additionally, the clock circuit 8 results in a simplified synthesis effort and timing closure. Moreover, there is an increased confidence in the method to cross data from a high frequency clock domain to a low frequency clock domain, and vice versa. Additionally, as further described herein, the clock circuit 8 may employ value change compression, which allows duplicate values in the input data X to be ignored, or discarded, on back-to-back bus cycles, which reduces the amount of traffic that would otherwise be communicated through the synchronous FIFO buffer 20-1.

Figure 2A:
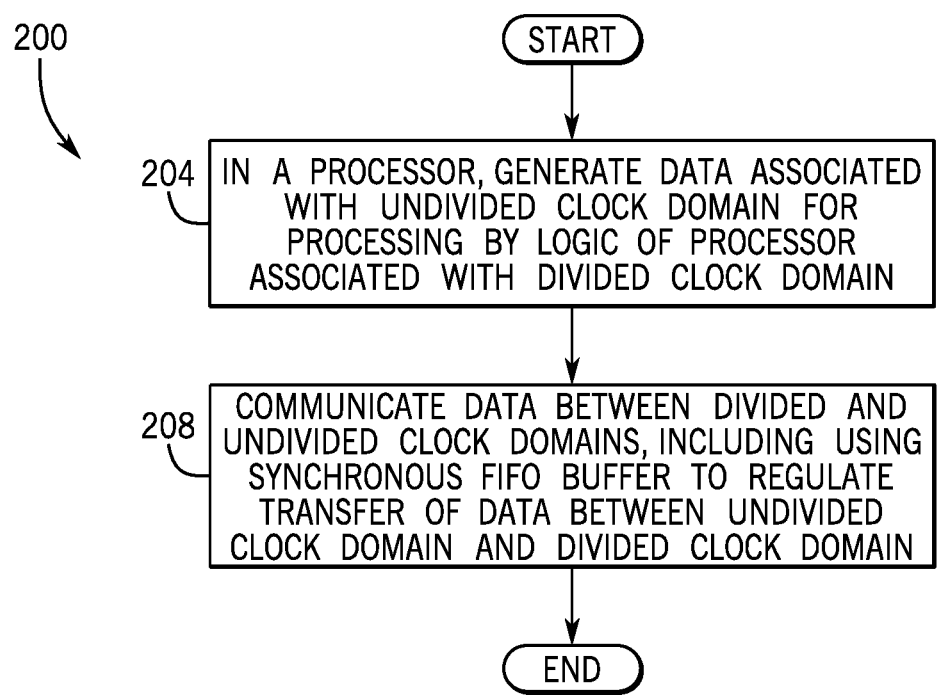
FIG. 2A is a flow diagram depicting a technique to transfer data between clock domains according to an example implementation.

Referring to FIG. 2, thus, in accordance with example implementations, a technique 200 includes, in a processor, generating data (block 204) associated with an undivided clock domain for processing by logic of the processor that is associated with a divided clock domain. The technique 200 includes communicating (block 208) between the divided and undivided clock domains, including using a synchronous first in first out (FIFO) buffer to regulate transfer of the data between the undivided clock domain and the divided clock domain.

Figure 2B:
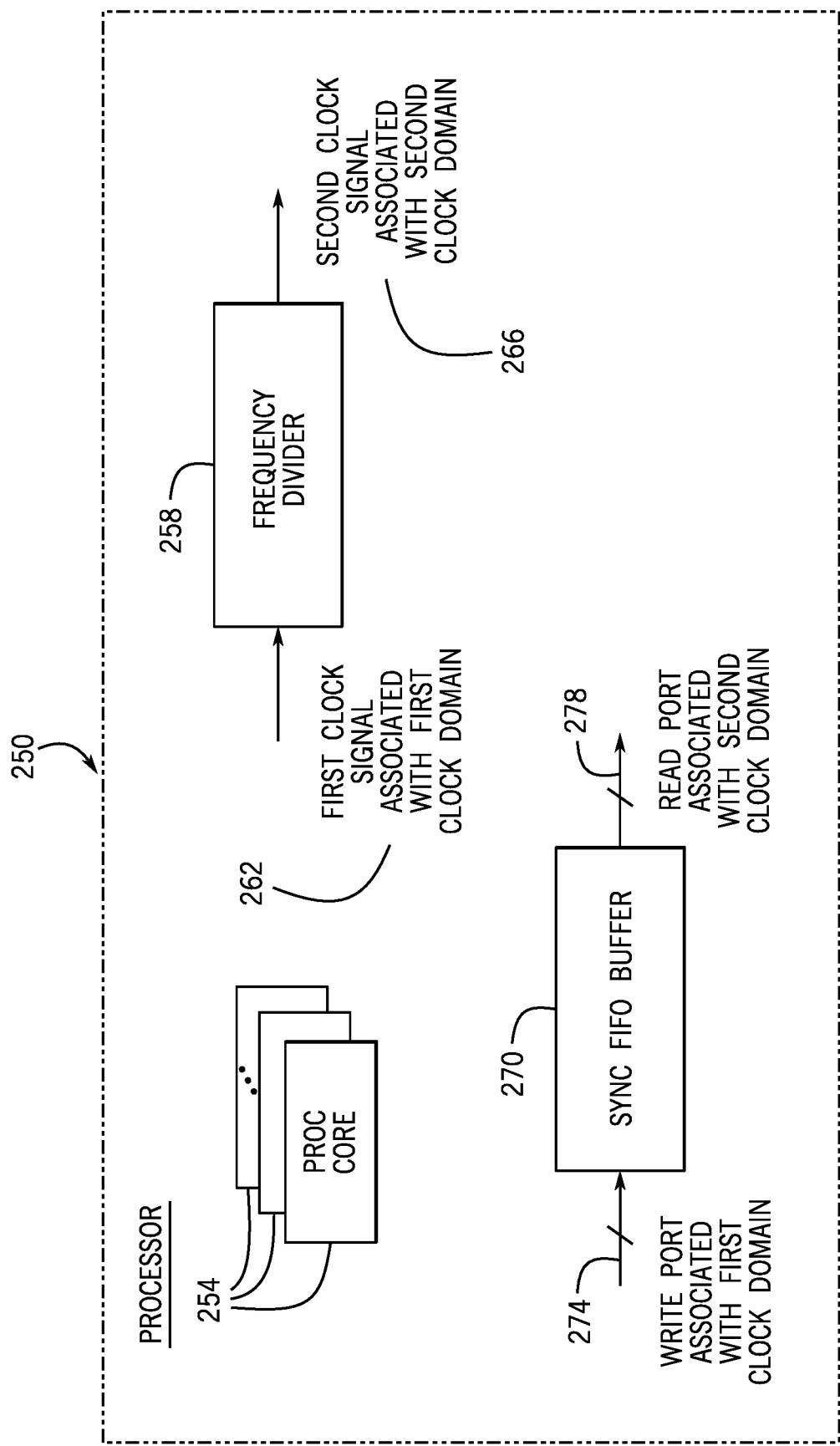
FIG. 2B is a schematic diagram of a processor according to an example implementation.

Moreover, referring to FIG. 2B, in accordance with example implementations, a processor 250 includes a plurality of processing cores 254; a frequency divider 258; and a synchronous first in first out (FIFO) buffer 270. The frequency divider 258 frequency divides a first clock signal 262 that is associated with a first clock domain to provide a second clock signal 266 that is associated with a second clock domain. The synchronous FIFO buffer 270 has a write port 274 that is associated with the first clock domain and a read port 278 that is associated with the second clock domain. The synchronous FIFO 270 communicates the data between the first and second clock domains.

Figure 3:
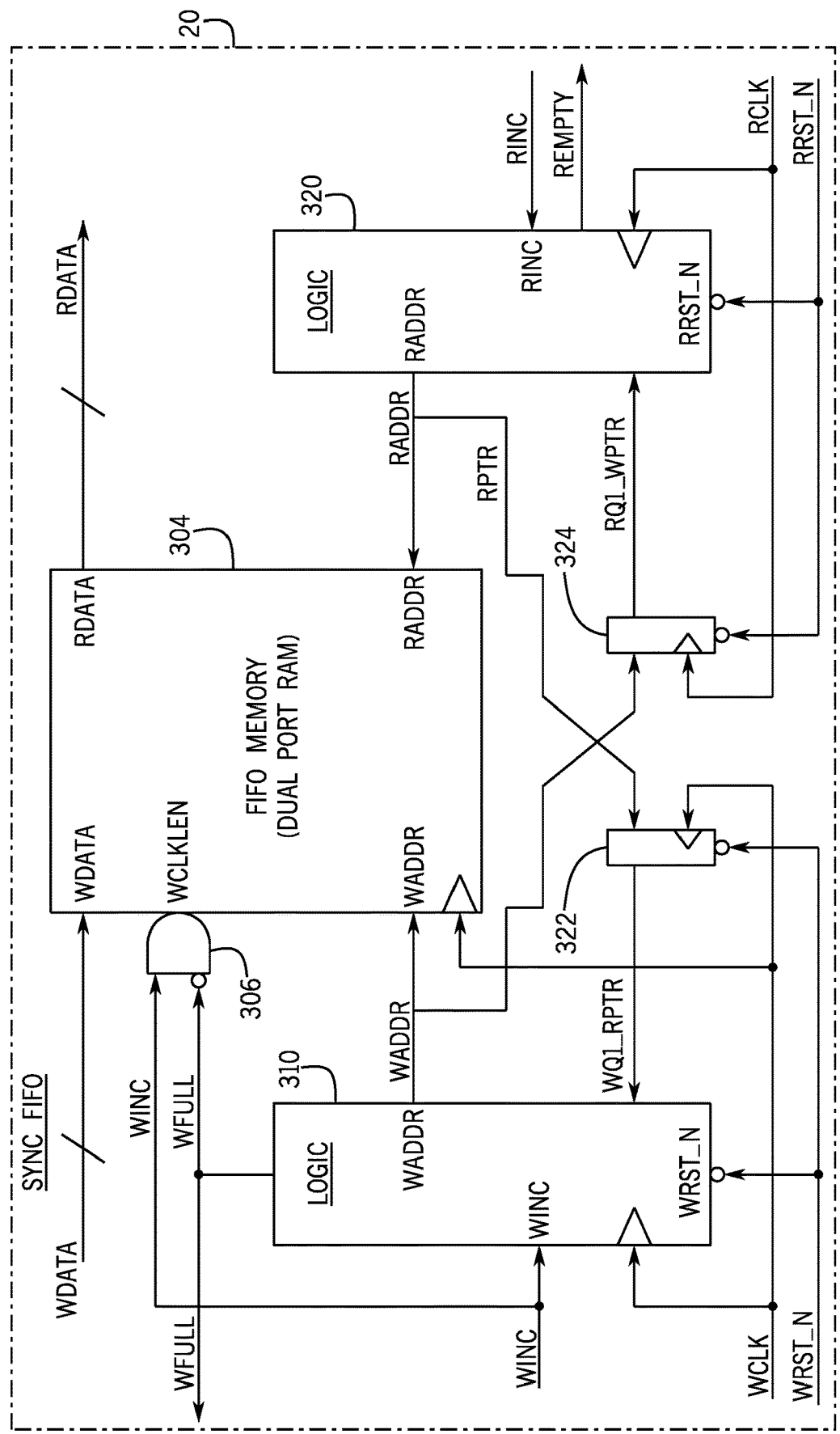
FIG. 3 is a schematic diagram of a synchronous first in first out (FIFO) buffer of the clock circuitry of FIG. 1 according to an example implementation.

FIG. 3 depicts an example implementation of the synchronous FIFO buffer 20. In general, in accordance with example implementations, the synchronous FIFO buffer 20 (20-1 or 20-2) includes a dual port random access memory (RAM) 304 that stores data communicated between clock domains. The dual port RAM has a WDATA input coupled to the WDATA input of the synchronous FIFO buffer 20 and a write port clock enable that is coupled to the output terminal of an AND gate 306. One input of the AND gate 306 is coupled to the WINC input, and an inverted input of the AND gate 306 is coupled to the WFULL output of the synchronous FIFO buffer 20. Therefore, when the write port of the dual port RAM 304 is not full, the output of the AND gate 306 enables clocking of the write port of the RAM 304. The write address (WADDR) and WFULL signals are provided by logic 310 of the synchronous FIFO buffer 20. In general, the logic 310 is clocked by the clock signal received at the WCLK input and generates the write address for the RAM 304. In accordance with example implementations, as long as the write port of the RAM 304 is not full, the logic 310 increments the write address in synchronization with the WCLK input on the rising edge of the WINC input.

The RAM 304 includes a read port that provides the data at the RDATA output, which is pointed to by a read address provided by logic 320. The logic 320 provides the read address to the RAM 304, and as long as the logic 320 determines that the RAM 304 has another entry to read, the logic 320 increments the read address in synchronization with the clock signal received on the RCLK input in response to a rising edge of the RINC input.

The architecture that is depicted in FIG. 3 is a degenerate case of an asynchronous FIFO, in which the read and write pointers are incremented on writes and reads, respectively. However, unlike the asynchronous FIFO, gray coding is not used. In this manner, because the CLKDIVN clock signal has a frequency that is an integer ratio of the CLK clock signal, these clock signals have a common edge and are synchronous at that edge. Therefore, gray coding is not used to mitigate the otherwise adverse effects of not capturing multiple bits changing at once through metaflops (where a "metaflop" refers to two serially coupled D-type flip-flops).

Accordingly, due to gray coding not being used, the write address that is provided by the logic 310 is clocked by a single D-type flip-flop 324 (instead of a metaflop) to produce a corresponding write pointer, which the logic 320 may use to determine whether the FIFO is empty. In a similar manner, the read address provided by the logic 320 is clocked through a single D-type flip-flop 322 (instead of a metaflop) to provide an indication of the read pointer to the logic 310 so that the logic 310 may determine whether or not the FIFO memory 304 is full. Because neither gray coding nor metaflops are used, the clock circuit 8 has the advantages of reduced pointer crossing latency and faster transfers across the clock domain boundaries 7 and 9. This may result in reducing the depth of the synchronous FIFO buffer circuits 20-1 and 20-2, as would otherwise be used to hide that latency.

In accordance with example implementations, the data that is provided to the clock circuit from the undivided clock domain 10 (to be processed by the logic 40) may be accompanied by a "data available" signal, and the clock circuit may apply value change compression to compress the data. More specifically, in accordance with example implementations, a clock circuit may contain a synchronous FIFO buffer circuit 500 (FIG. 5A) to communicate signals from the undivided clock domain 10 to the divided clock domain 12. The synchronous FIFO buffer circuit 500 performs value change compression.

Figure 5A:
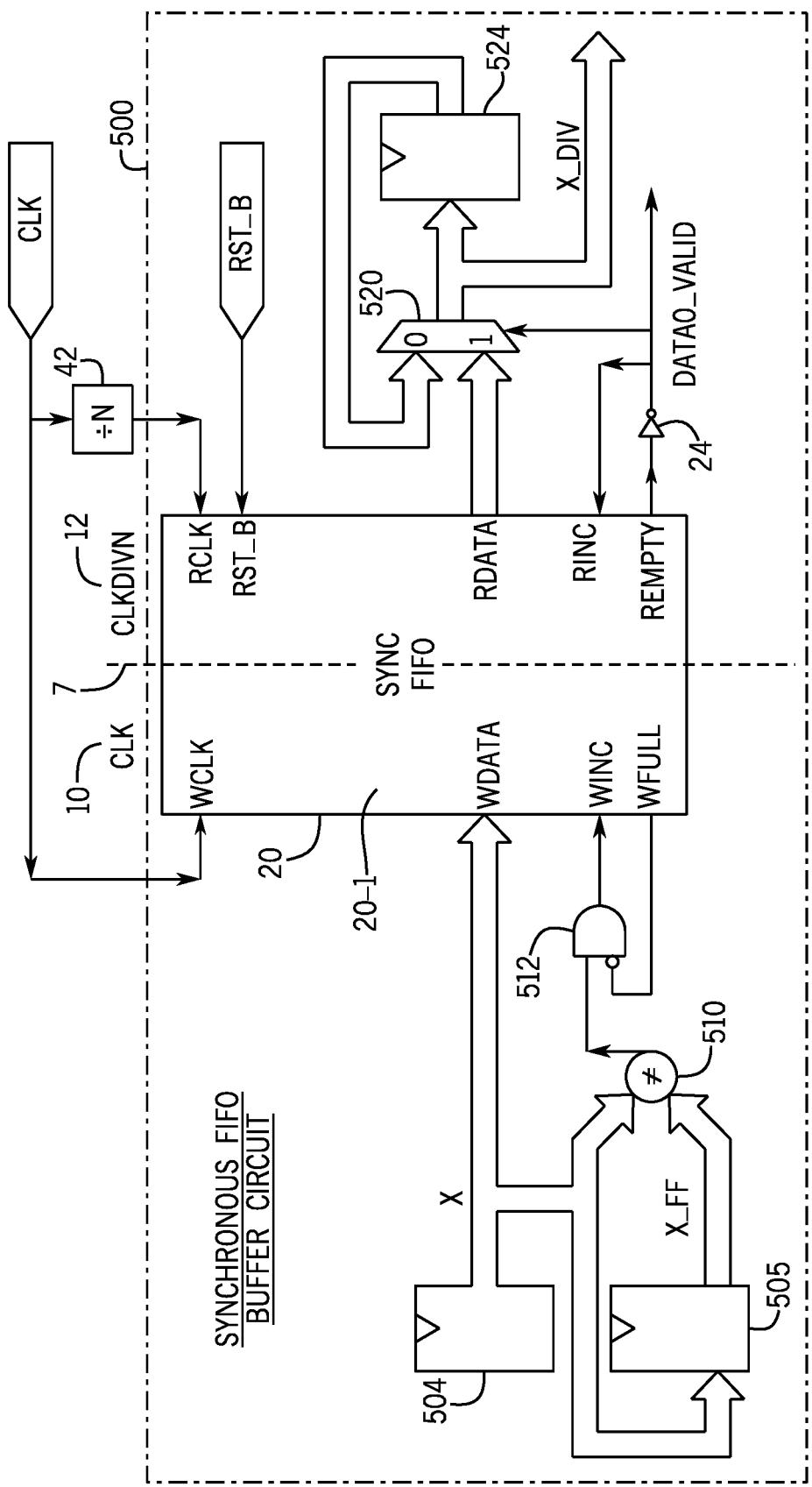
FIGS. 5A and 5B are schematic diagrams of synchronous FIFO buffer circuits to perform value change compression according to example implementations.

More specifically, referring to FIG. 4A in conjunction with FIG. 5A, data may be communicated from the undivided clock domain to the clock circuit using a bus. In this manner, the data that is associated with a given source (processor core or thread) may appear on the bus in a time sequence of bus cycles in which the data available signal is asserted (driven high, for example). FIG. 4A depicts four example data values (represented by "A," "B," "B" and "D" in FIG. 4A) that appear on the bus in four time successive bus cycles (represented by a signal called "CYCLE#" in FIG. 4A) in association with the assertion of an available signal (called "SIG1_AVAIL" in FIG. 4A). The bus cycles are synchronous to the undivided CLK clock signal. One way to store the data in the synchronous FIFO buffer 20-1 is to store all of the A, B, B and D data values in the memory of the FIFO buffer 20-1 in synchronization with the CLK clock signal and retrieve the A, B, B and D data values from the FIFO buffer 20-1 in synchronization with the divided clock signal (called "CLKDIV4" in FIG. 4A and having one fourth the frequency of the CLK signal). The communication of the A, B, B and D data values between the undivided 10 and divided 12 clock domains is represented at reference numerals 412, 414, 416 and 418, respectively, in FIG. 4A.

The two "B" data values in FIG. 4A are redundant values that are associated with redundant processing requests for the logic 40 (FIG. 1). As a more specific example, the logic 40 may be a DRNG, and the two B data values may be associated with multiple requests for the DRNG to generate a random number and store the random number in a processor register (identified by the B data value).

In accordance with example implementations, the synchronous FIFO buffer circuit 500 performs value change compression to discard redundant values (such as the second B value of FIG. 4A, for example). In this manner, as depicted at reference numerals 420, 422 and 424 in FIG. 4B, due to the value change compression, the synchronous FIFO buffer circuit 500 stores the A value, the first B value and the D value in the FIFO memory, and the synchronous FIFO buffer circuit 500 discards the second B value.

The value change compression has the advantage of reducing the depth of the FIFO memory that is otherwise needed to prevent data loss. Moreover, the value change compression saves power, as the compression eliminates writes and reads that would otherwise be incurred to store and retrieve redundant data values.

In accordance with some implementations, the value change compression may be an optional feature of the clock circuit and may be, for example, set via a compile-time parameter (for implementations in which circuitry for the clock circuit is created by the execution of machine executable instructions by a machine, for example).

Although value change compression is described herein for compressing values representing values generated by a DRNG, the value change compression may be used to eliminate redundant values other than values generated by a DRNG, in accordance with further example implementations. Moreover, although a single DRNG is described herein, in accordance with further example implementations, the processor may contain multiple physical entropy sources (eight sources, for example), and one or multiple clock circuits may be used to communicate signals between the corresponding divided and undivided clock domains.

Referring to FIG. 5A, in accordance with example implementations, the synchronous FIFO buffer circuit 500 performs the value change compression by controlling when the write pointer to the FIFO memory is incremented. In this manner, the synchronous FIFO buffer circuit 500 contains comparison logic 510 that provides a signal to indicate whether the undivided clock data X (provided by a multiple bit D-type flip-flop 504 that is clocked by the undivided CLK clock signal and has an input coupled to the data lines for the bus) for the current bus cycle is the same as the undivided clock data for the previous bus cycle (here, the previous undivided clock data is represented by "X_FF" and is provided by a multiple bit D-type flip-flop 505 that receives the clock data X). In accordance with example implementations, the comparison logic 510 asserts (drives high, for example) its output signal to indicate that two time successive data values are not equal; and the logic 510 deasserts (drives low, for example) its output signal to indicate that the two time successive data values are equal.

The output signal that is provided by the comparison logic 510 is received as an input to an AND gate 512. An inverted input of the AND gate 512 receives a signal from the WFULL output of the synchronous FIFO buffer 20-1. Therefore, in accordance with example implementations, in response to the comparison logic 510 detecting that two time successive data values (associated with back-to-back bus cycles) are equal, the write pointer is not incremented. Otherwise, in response to the comparison logic 510 detecting that two time successive data values are unequal, the write pointer is incremented.

In accordance with example implementations, when there is only one valid entry in the memory of the synchronous FIFO buffer circuit 20-1, the circuit 20-1 increments the read pointer and on the next divided clock CLKDIVN signal, asserts (drives high, for example) the REMPTY signal to indicate that the FIFO buffer is empty. The side effect of this behavior is that the RDATA output also changes on the same clock cycle for which the REMPTY signal is asserted, thereby causing the RDATA output to represent a data value, which is no longer valid. If this behavior is not desired for functional or power reasons, then, in accordance with example implementations, the synchronous buffer circuit 500 may include a recycling circuit, which remembers the last valid RDATA value and provides this value as an output data value to the logic 40 when the REMPTY signal is asserted.

In accordance with example implementations, the recycling circuit includes a multiplexer 520 that has one multiple bit input that is coupled to the RDATA output and another multiple bit input that is coupled to the output of a multiple bit, D-type flip-flop 524, which is clocked by the CLKDIVN divided clock signal. The input of the D-type flip-flop 524 is coupled to the output of the multiplexer 520, and the select input of the multiplexer 520 is coupled to the output of the inverter 24 (whose input is coupled to the REMPTY output). The output of the multiplexer 520 provides the X_DIV output to the logic 40. When the REMPTY signal is asserted, the multiplexer 520 selects the previous RDATA value (provided by the output of the D-type flip-flop 524) for the X_DIV output; and otherwise, when the REMPTY signal is deasserted, the multiplexer 520 selects the current RDATA value for the X_DIV output.

In accordance with some implementations, the recycling circuit may be an optional feature of the clock circuit and may be, for example, be set via a compile-time parameter (for implementations in which circuitry for the clock circuit is created by the execution of machine executable instructions by a machine, for example).

If the width of the bus is large (a 256 bit bus, for example), then a write increment signal and a reduced bit source selector, or pointer (used to multiplex multiple sources to the bus), may be provided by logic that is external to the clock circuit. More specifically, referring to FIG. 5B, in accordance with further example implementations, the synchronous FIFO buffer circuit 500 may be replaced with a synchronous FIFO buffer circuit 550.

Figure 5B:
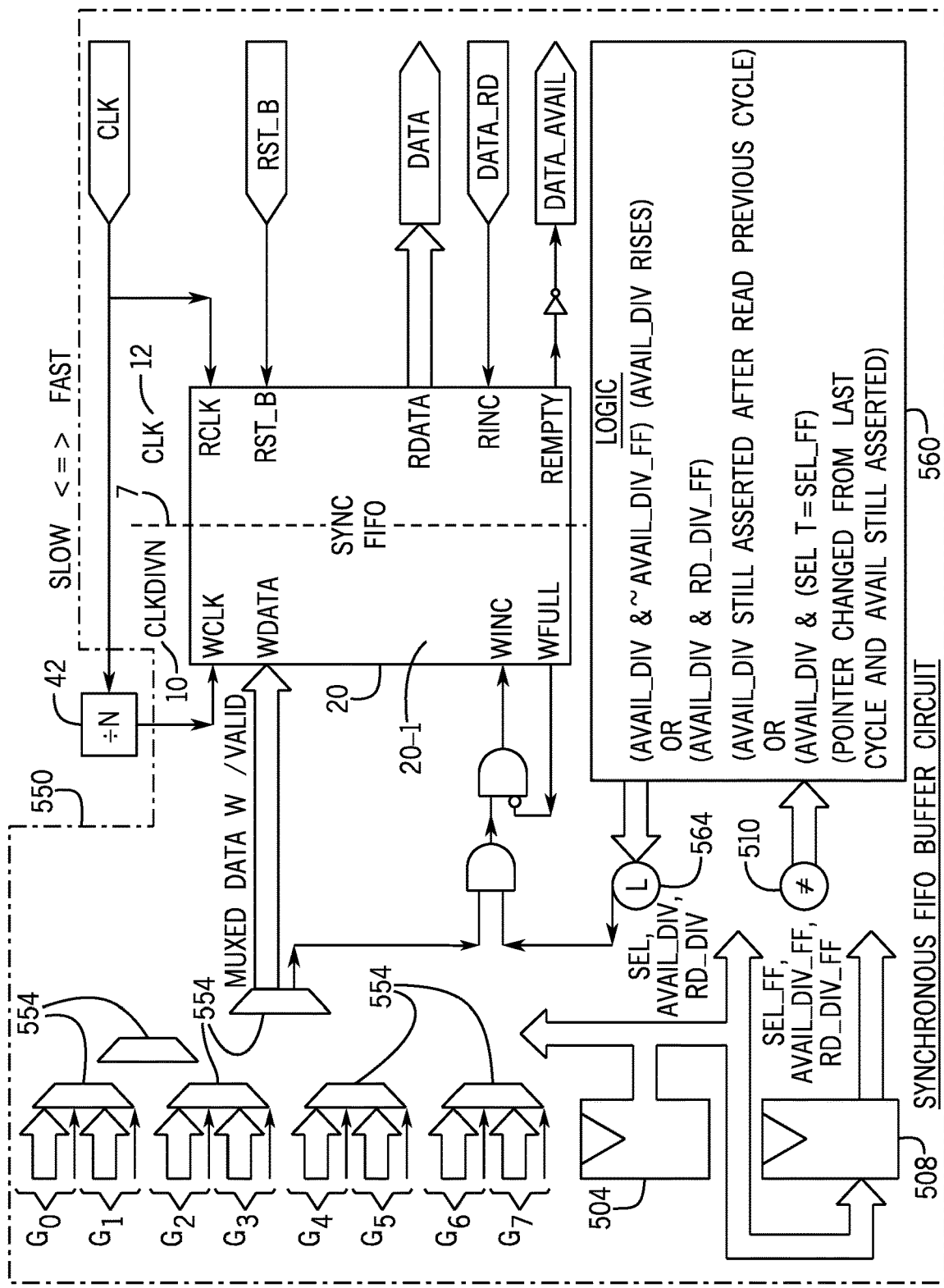

The synchronous FIFO buffer circuit 550 includes a multiple bit D-type flip-flop 504 that is clocked by the CLK undivided clock signal and receives a multiple bit source selection signal (called "SEL" in FIG. 5B). The SEL signal is received at input of multiplexer circuitry 554 for purposes of selecting a source (a processor core or thread, for example) that provides multiplexed data (corresponding to the selected source) and data to the bus. The data is accompanied by a data available signal (called AVAIL_DIV in FIG. 5B), which is also received by the D-type flip-flop 504. As depicted in FIG. 5B, the D-type flip-flop 504 also receives a signal (called "RD_DIV" in FIG. 5B) that is asserted (driven high, for example) to indicate that data is being read from the bus. A multiple bit D-type flip-flop 508 is clocked by the CLK clock signal; receives the SEL, AVAIL_DIV and RD_DIV signals; and generates delayed SEL_FF, AVAIL_DIV and RD_DIV signals, respectively.

Logic 564 of the synchronous FIFO buffer circuit 550 generates an output signal that is asserted (driven high, for example) to enable incrementing the write pointer and deasserted to disable incrementing the write pointer (i.e., deasserted to effect value change compression). As depicted in FIG. 5B, the output signal of the logic 564 is combined by additional logic with a valid signal (provided with the data from the bus) and the WFULL so that the write pointer is incremented when the data is available, the FIFO buffer is not full and the signal provided by the logic 564 is asserted. The synchronous FIFO buffer circuit 550 also includes the comparison logic 510 that compares the last two time successive data values and generates a signal representing, or indicating, the result of the comparison, as described above.

As depicted in block 560, in accordance with example implementations, the logic 564 receives the AVAIL_DIV, AVAIL_DIV FF, RD_DIV, RD_DIV FF, SEL and SEL_DIV signals; and the logic 564 receives the signal that is provided by the comparison logic 510. Based on these signals, the logic 560 detects for the presence of one of the following states: 1. a state in which the AVAIL_DIV signal is rising; 2. a state in which the AVAIL_DIV signal is still asserted after a previous read cycle; or 3. a state in which the source selector changed from the last read cycle and the AVAIL_DIV signal is still asserted. In accordance with example implementations, in response to detecting state 1 or 3, the logic 560 asserts its output signal. In response to detecting state 2, the logic 560 deasserts its output signal to effect value change compression if the comparison logic 560 indicates that the last data value is the same as the present data value.

In accordance with example implementations, the FIFO memory of any of the clock circuits that are described herein may have a size, or depth, of one or more valid entries.

Other variations are contemplated, which are within the scope of the appended claims. For example, in accordance with further example implementations, the synchronous FIFO buffer circuit 550 may also include the output data recycling circuit of the synchronous FIFO buffer circuit 500.

Figure 6A:
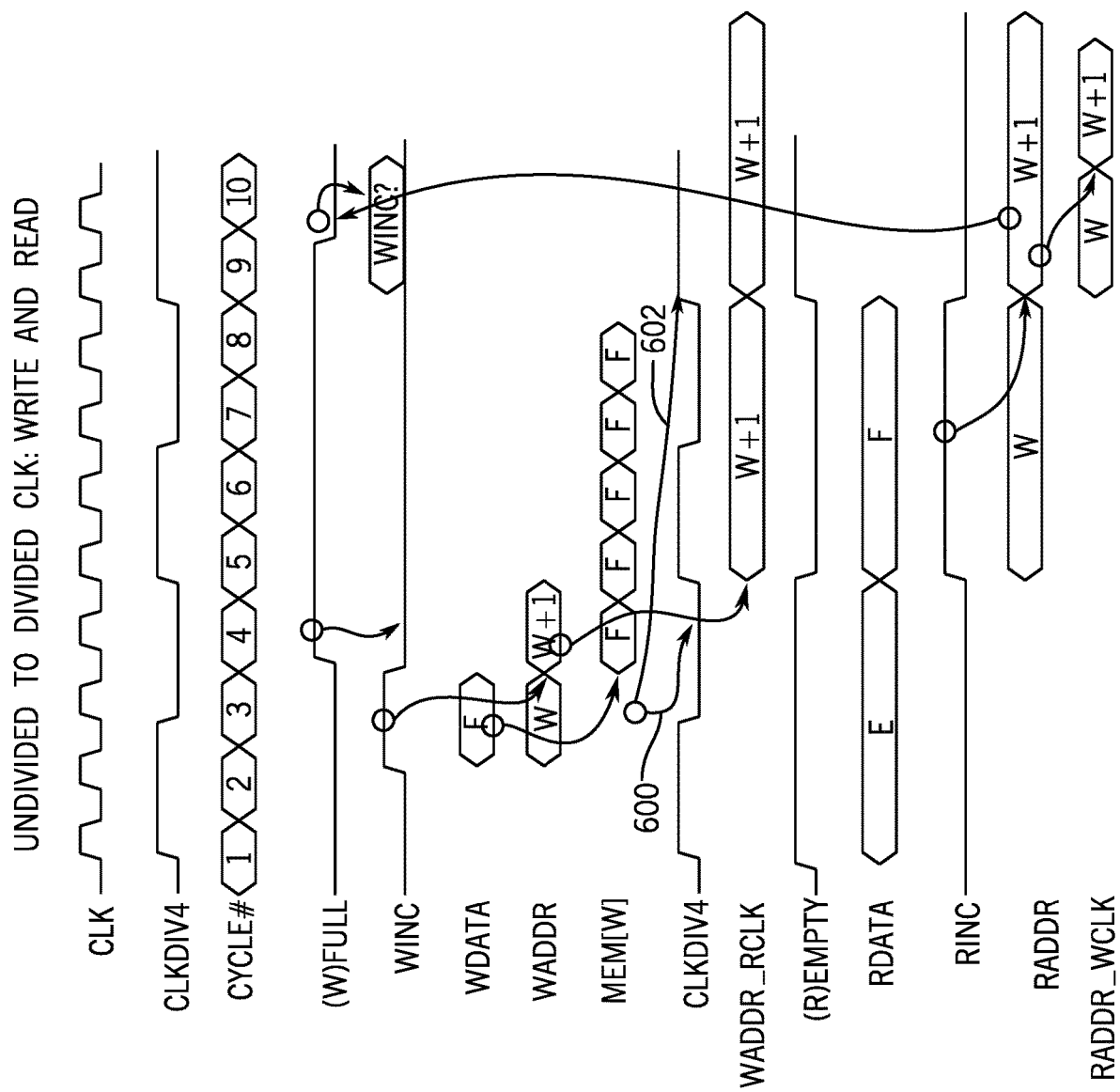
FIG. 6A depicts waveforms associated with the transfer of data from the undivided clock domain to the divided clock domain according to an example implementation.

FIG. 6A depicts timing diagrams for the transition from the undivided clock domain 10 to the divided clock domain 12 to show how the clock circuit guarantees that read-before-write hazards do not occur. The timing diagrams also shown the multi-cycle path used to help static timing analysis to time the clock circuit correctly. In this way, the multi-cycle paths are contained and provided within the clock circuit based on the clock division ratio (N). The remainder of the timing is correct by construction and may be readily understood by synthesis and static analysis timing tools based on the divided clock being generated from the undivided clock.

In FIG. 6A, reference numeral 600 illustrates a transition associated with the worst case clock alignment, which static analysis timing tools (Design Compiler or Prime Time, for example) would see. Reference numeral 602 shows the real timing path. The difference is because it is not until cycle 5 that REMPTY becomes low to signify that RDATA is valid. In accordance with example implementations, RADDR, and MEM[RADDR] (and therefore RDATA) are guaranteed to be held stable during the entire following CLKDIV4 cycle (4 undivided clock cycles). So while MEM[WADDR] may be written in cycle 4, right before the CLKDIV4 rising edge, the divided clock logic is not required to finish in cycle 4; the logic really has cycles 5 through 8 to do its work. Thus, the multi-cycle path reasoning, review, and formal verification are all consolidated into the FIFO itself and completely decoupled from the logic that will benefit from the relaxation.

Figure 6B:
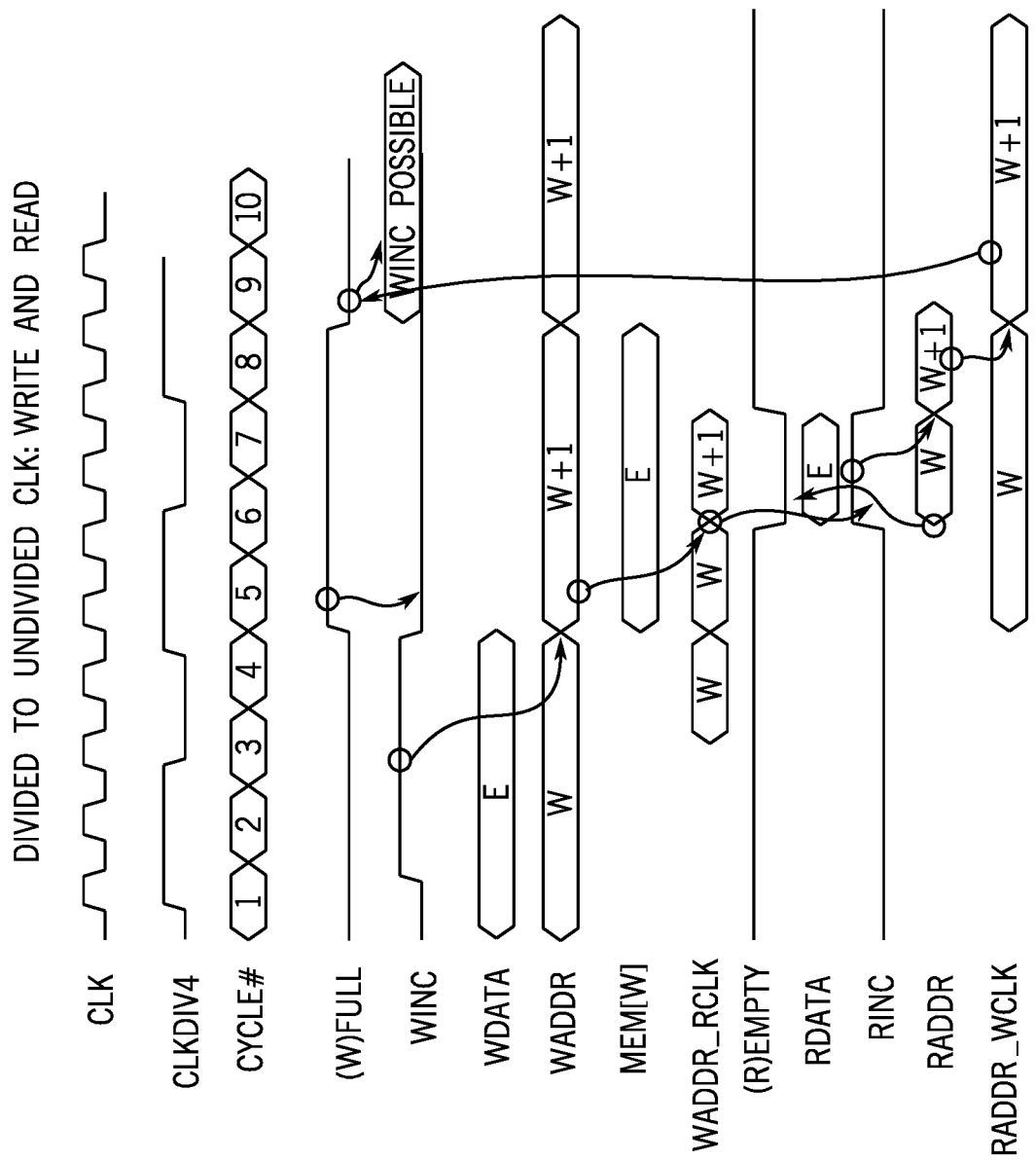
FIG. 6B depicts example waveforms associated with the transfer of data from the divided clock domain to the undivided clock domain according to an example implementation.

FIG. 6B depicts timing diagrams for the transition from the divided clock domain 10 to the undivided clock domain 12 for the worst case clock alignment. As can been seen no multi-cycle overrides are needed.

Figure 7A:
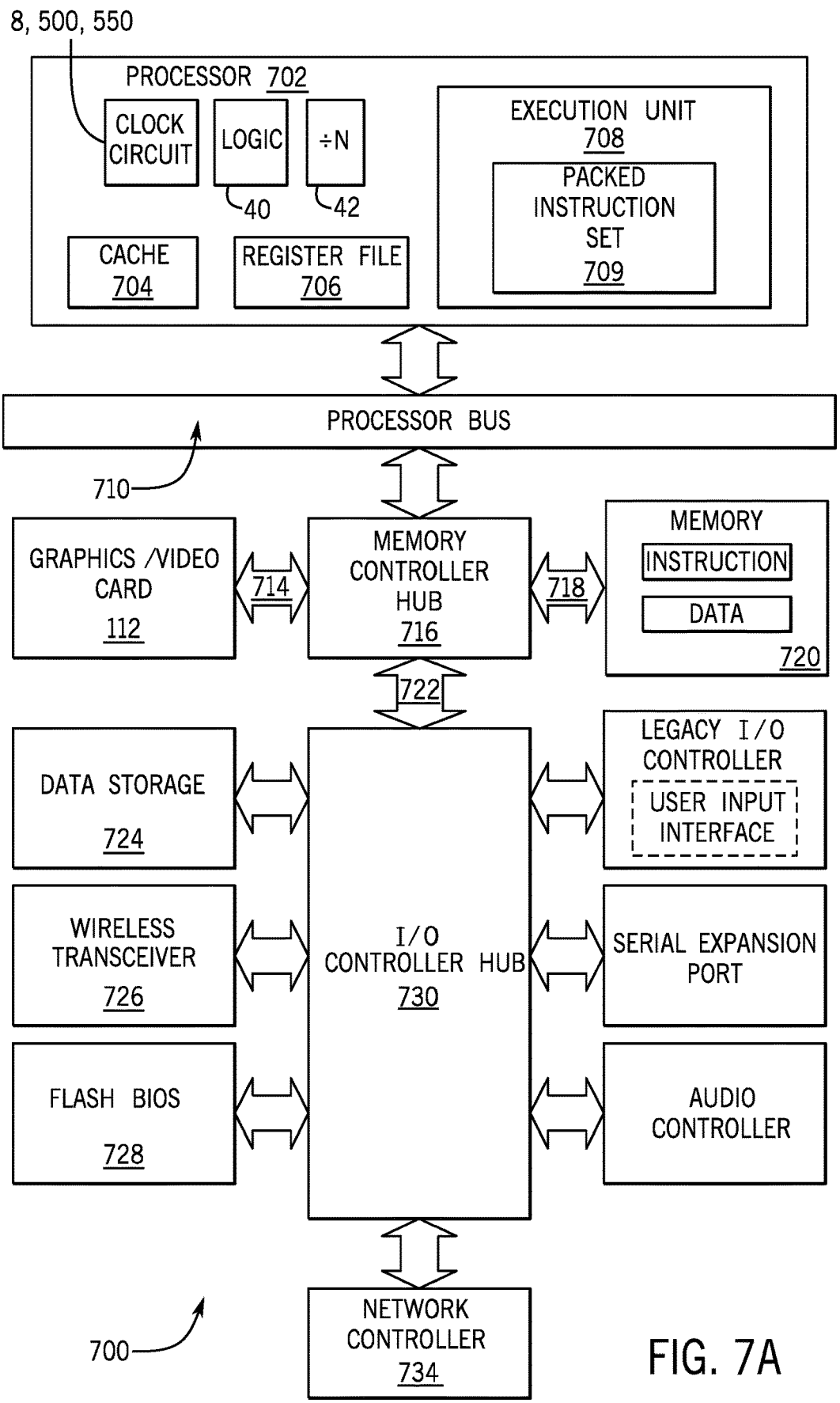
FIGS. 7A, 7B and 7C are block diagrams of systems according to example implementations.

The clock circuits that are disclosed herein may be used in a wide range of processors and computer systems, in accordance with different implementations. For example, FIG. 7A is a block diagram of an exemplary computer system 700 formed with a processor that includes execution units to execute an instruction in accordance with one example implementation. System 700 includes a component, such as a processor 702 to employ execution units including logic to perform algorithms for process data, in accordance with the present invention, such as in the implementation described herein. System 700 is representative of processing systems based on the PENTIUM® III, PENTIUM® 4, Xeon™, Itanium®, XScale™ and/or StrongARM™ microprocessors available from Intel Corporation of Santa Clara, Calif., although other systems (including PCs having other microprocessors, engineering workstations, set-top boxes and the like) may also be used. In one implementation, sample system 700 may execute a version of the WINDOWS™ operating system available from Microsoft Corporation of Redmond, Wash., although other operating systems (UNIX and Linux for example), embedded software, and/or graphical user interfaces, may also be used. Thus, example implementations are not limited to any specific combination of hardware circuitry and software.

Implementations are not limited to computer systems. Alternative example implementations can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one implementation.

In accordance with example implementations, the processor 702 includes one or more execution units 708 to perform an algorithm to perform at least one instruction in accordance with one example implementation. One implementation may be described in the context of a single processor desktop or server system, but alternative implementations can be included in a multiprocessor system. System 700 is an example of a 'hub' system architecture. The computer system 700 includes a processor 702 to process data signals. The processor 702 can be a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 702 is coupled to a processor bus 710 that can transmit data signals between the processor 702 and other components in the system 700. The elements of system 700 perform their conventional functions that are well known to those familiar with the art.

In one implementation, the processor 702 includes a Level 1 (L1) internal cache memory 704. Depending on the architecture, the processor 702 can have a single internal cache or multiple levels of internal cache. Alternatively, in another implementation, the cache memory can reside external to the processor 702. Other implementations can also include a combination of both internal and external caches depending on the particular implementation and needs. Register file 706 can store different types of data in various registers including integer registers, floating point registers, status registers, and instruction pointer register.

Execution unit 708, including logic to perform integer and floating point operations, also resides in the processor 702. The processor 702 also includes a microcode (μ code) ROM that stores microcode for certain macroinstructions. For one implementation, execution unit 708 includes logic to handle a packed instruction set 709. By including the packed instruction set 709 in the instruction set of a general-purpose processor 702, along with associated circuitry to execute the instructions, the operations used by many multimedia applications may be performed using packed data in a general-purpose processor 702. Thus, many multimedia applications can be accelerated and executed more efficiently by using the full width of a processor's data bus for performing operations on packed data. This can eliminate the need to transfer smaller units of data across the processor's data bus to perform one or more operations one data element at a time.

Alternate implementations of an execution unit 708 can also be used in micro controllers, embedded processors, graphics devices, DSPs, and other types of logic circuits. System 700 includes a memory 720. Memory 720 can be a dynamic random access memory (DRAM) device, a static random access memory (SRAM) device, flash memory device, or other memory device. Memory 120 can store instructions and/or data represented by data signals that can be executed by the processor 702.

A system logic chip 716 is coupled to the processor bus 110 and memory 720. The system logic chip 716 in the illustrated implementation is a memory controller hub (MCH). The processor 702 can communicate to the MCH 716 via a processor bus 710. The MCH 716 provides a high bandwidth memory path 718 to memory 720 for instruction and data storage and for storage of graphics commands, data and textures. The MCH 716 is to direct data signals between the processor 702, memory 720, and other components in the system 700 and to bridge the data signals between processor bus 710, memory 720, and system I/O 722. In some implementations, the system logic chip 716 can provide a graphics port for coupling to a graphics controller 712. The MCH 716 is coupled to memory 720 through a memory interface 718. The graphics card 712 is coupled to the MCH 716 through an Accelerated Graphics Port (AGP) interconnect 714.

System 700 uses a proprietary hub interface bus 722 to couple the MCH 716 to the I/O controller hub (ICH) 730. The ICH 730 provides direct connections to some I/O devices via a local I/O bus. The local I/O bus is a high-speed I/O bus for connecting peripherals to the memory 720, chipset, and processor 702. Some examples are the audio controller, firmware hub (flash BIOS) 728, wireless transceiver 726, data storage 724, legacy I/O controller containing user input and keyboard interfaces, a serial expansion port such as Universal Serial Bus (USB), and a network controller 734. The data storage device 724 can comprise a hard disk drive, a floppy disk drive, a CD-ROM device, a flash memory device, or other mass storage device.

For another implementation of a system, an instruction in accordance with one implementation can be used with a system on a chip. One implementation of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

As depicted in FIG. 7A, the processor 702 may include the logic 40; frequency dividers; and the clock circuit. As depicted in FIG. 7A, the clock circuit may be the clock circuit 8 (FIG. 1), the clock circuit 8 as modified to include the synchronous FIFO buffer circuit 500 (FIG. 5A), the clock circuit 8 as modified to include the synchronous FIFO buffer 550 (FIG. 5B), and so forth.

Figure 7B:
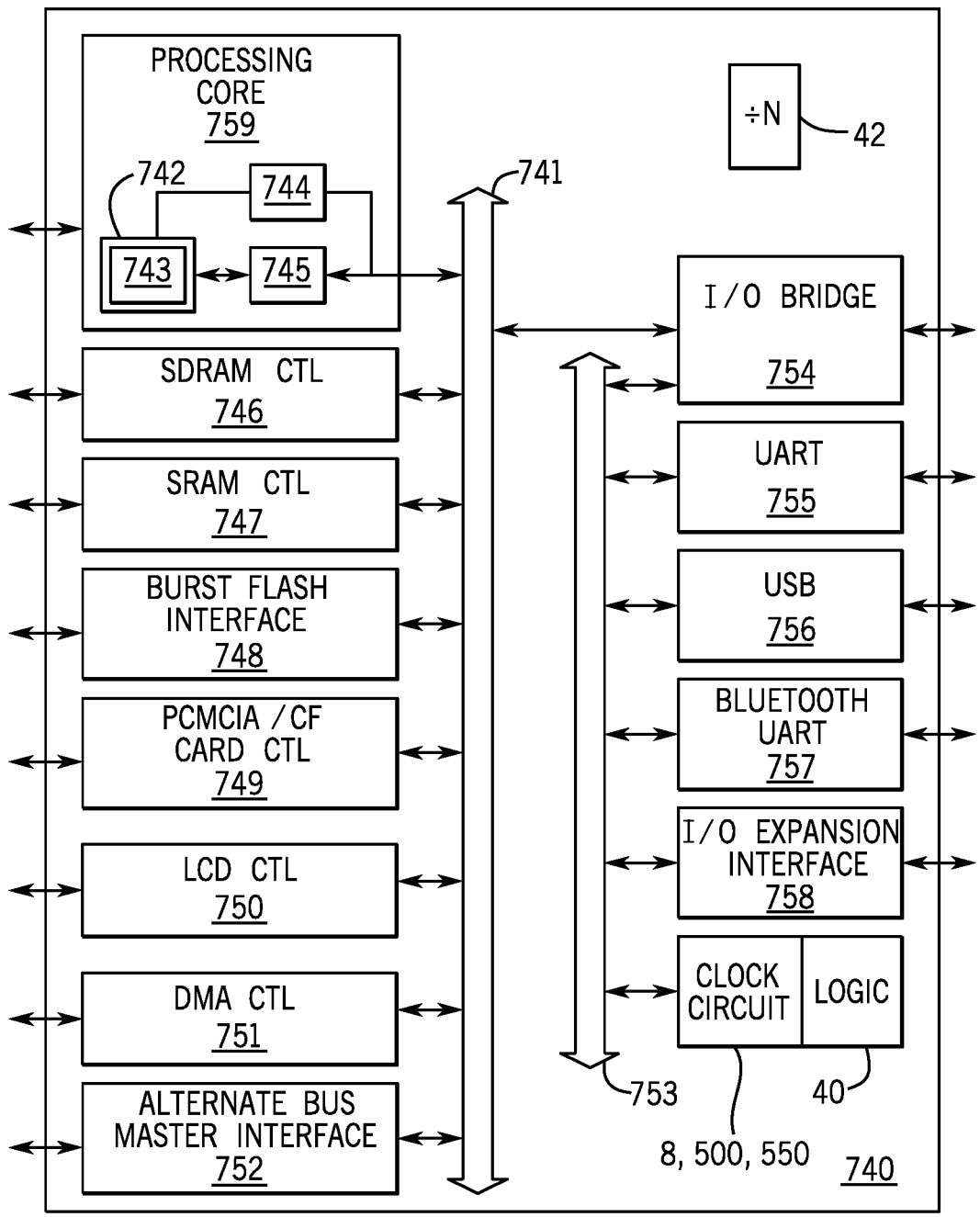

FIG. 7B illustrates a data processing system 740 which implements the principles of one example implementation. It will be readily appreciated by one of skill in the art that the implementations described herein can be used with alternative processing systems without departure from the scope of implementations of the invention.

Computer system 740 comprises a processing core 759 capable of performing at least one instruction in accordance with one implementation. For one implementation, processing core 759 represents a processing unit of any type of architecture, including but not limited to a CISC, a RISC or a VLIW type architecture. Processing core 759 may also be suitable for manufacture in one or more process technologies and by being represented on a machine readable media in sufficient detail, may be suitable to facilitate said manufacture.

Processing core 759 comprises an execution unit 742, a set of register file(s) 745, and a decoder 744. Processing core 759 also includes additional circuitry (not shown) which is not necessary to the understanding of example implementations. Execution unit 742 is used for executing instructions received by processing core 759. In addition to performing typical processor instructions, execution unit 742 can perform instructions in packed instruction set 743 for performing operations on packed data formats. Packed instruction set 743 includes instructions for performing implementations of the invention and other packed instructions. Execution unit 742 is coupled to register file 745 by an internal bus. Register file 745 represents a storage area on processing core 759 for storing information, including data. As previously mentioned, it is understood that the storage area used for storing the packed data is not critical. Execution unit 742 is coupled to decoder 744. Decoder 744 is used for decoding instructions received by processing core 759 into control signals and/or microcode entry points. In response to these control signals and/or microcode entry points, execution unit 742 performs the appropriate operations. In one implementation, the decoder is used to interpret the opcode of the instruction, which will indicate what operation should be performed on the corresponding data indicated within the instruction.

Processing core 759 is coupled with bus 741 for communicating with various other system devices, which may include but are not limited to, for example, synchronous dynamic random access memory (SDRAM) control 746, static random access memory (SRAM) control 747, burst flash memory interface 748, personal computer memory card international association (PCMCIA)/compact flash (CF) card control 749, liquid crystal display (LCD) control 750, direct memory access (DMA) controller 751, and alternative bus master interface 752. In one implementation, data processing system 740 may also comprise an I/O bridge 754 for communicating with various I/O devices via an I/O bus 753. Such I/O devices may include but are not limited to, for example, universal asynchronous receiver/transmitter (UART) 755, universal serial bus (USB) 756, Bluetooth wireless UART 757 and I/O expansion interface 758.

As depicted in FIG. 7B, the data processing system 740 may include the frequency divider 42; clock circuit 8, 500, 550; and logic 40. The processor core 759 may communicate with the logic 40 using the bus 741.

One implementation of data processing system 740 provides for mobile, network and/or wireless communications and a processing core 759 capable of performing SIMD operations including a text string comparison operation. Processing core 759 may be programmed with various audio, video, imaging and communications algorithms including discrete transformations such as a Walsh-Hadamard transform, a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM).

Figure 7C:
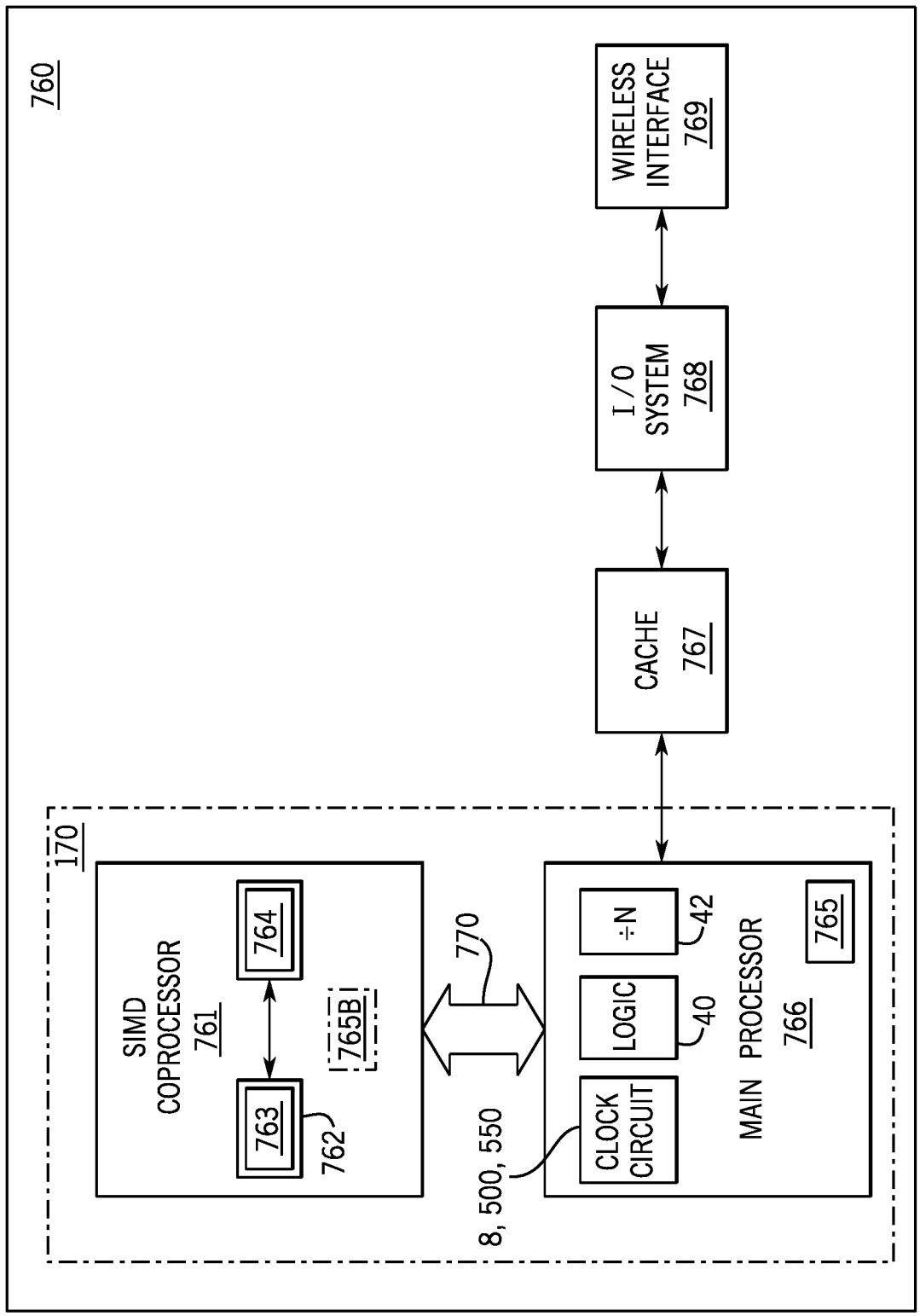

FIG. 7C illustrates yet alternative implementations of a data processing system 760 capable of performing SIMD text string comparison operations. In accordance with one alternative implementation, data processing system 760 may include a main processor 766 (containing the clock circuit 8, 500 or 550; the logic 40 and frequency divider 42, for example), a SIMD coprocessor 761, a cache memory 767, and an input/output system 768. The input/output system 768 may optionally be coupled to a wireless interface 769. SIMD coprocessor 761 is capable of performing operations including instructions in accordance with one implementation. Processing core 770 may be suitable for manufacture in one or more process technologies and by being represented on a machine readable media in sufficient detail, may be suitable to facilitate the manufacture of all or part of data processing system 760 including processing core 770.

For one implementation, SIMD coprocessor 761 comprises an execution unit 762 and a set of register file(s) 764. One implementation of main processor 765 comprises a decoder 765 to recognize instructions of instruction set 763 including instructions in accordance with one implementation for execution by execution unit 762. For alternative implementations, SIMD coprocessor 761 also comprises at least part of decoder 765B to decode instructions of instruction set 763. Processing core 770 also includes additional circuitry (not shown) which is not necessary to the understanding of example implementations.

In operation, the main processor 766 executes a stream of data processing instructions that control data processing operations of a general type including interactions with the cache memory 767, and the input/output system 768. Embedded within the stream of data processing instructions are SIMD coprocessor instructions. The decoder 765 of main processor 766 recognizes these SIMD coprocessor instructions as being of a type that should be executed by an attached SIMD coprocessor 761. Accordingly, the main processor 766 issues these SIMD coprocessor instructions (or control signals representing SIMD coprocessor instructions) on a coprocessor bus 770 where from they are received by any attached SIMD coprocessors. In this case, the SIMD coprocessor 761 will accept and execute any received SIMD coprocessor instructions intended for it.

Data may be received via wireless interface 769 for processing by the SIMD coprocessor instructions. For one example, voice communication may be received in the form of a digital signal, which may be processed by the SIMD coprocessor instructions to regenerate digital audio samples representative of the voice communications. For another example, compressed audio and/or video may be received in the form of a digital bit stream, which may be processed by the SIMD coprocessor instructions to regenerate digital audio samples and/or motion video frames. For one implementation of processing core 770, main processor 766, and a SIMD coprocessor 761 are integrated into a single processing core 770 comprising an execution unit 762, a set of register file(s) 764, and a decoder 765 to recognize instructions of instruction set 763 including instructions in accordance with one implementation.

Figure 8:
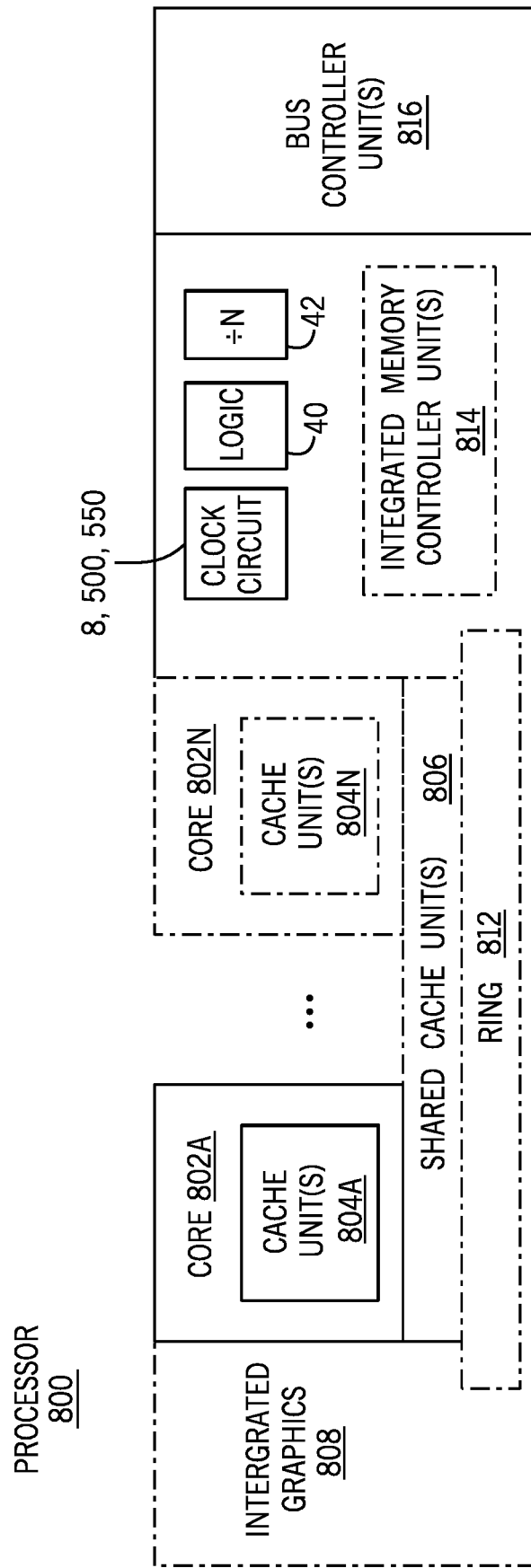
FIG. 8 is a block diagram of a processor according to an example implementation.

FIG. 8 is a block diagram of a single core processor and a multicore processor 800 with integrated memory controller and graphics according to implementations of the invention. The solid lined boxes in FIG. 8 illustrate a processor 800 with a single core 802A, a system agent 810, a set of one or more bus controller units 816, while the optional addition of the dashed lined boxes illustrates an alternative processor 800 with multiple cores 802A-N, a set of one or more integrated memory controller unit(s) 814 in the system agent unit 810, and an integrated graphics logic 808. The processor 800 includes the clock circuit 8, 500, 550; the logic 40 and the frequency divider 42.

The memory hierarchy includes one or more levels of cache within the cores, a set or one or more shared cache units 806, and external memory (not shown) coupled to the set of integrated memory controller units 814. The set of shared cache units 806 may include one or more mid-level caches, such as level 2 (L2), level 3 (L3), level 4 (L4), or other levels of cache, a last level cache (LLC), and/or combinations thereof. While in one implementation a ring based interconnect unit 812 interconnects the integrated graphics logic 808, the set of shared cache units 806, and the system agent unit 810, alternative implementations may use any number of well-known techniques for interconnecting such units.

In some implementations, one or more of the cores 802A-N are capable of multi-threading. The system agent 810 includes those components coordinating and operating cores 802A-N. The system agent unit 810 may include for example a power control unit (PCU) and a display unit. The PCU may be or include logic and components needed for regulating the power state of the cores 802A-N and the integrated graphics logic 808. The display unit is for driving one or more externally connected displays.

The cores 802A-N may be homogenous or heterogeneous in terms of architecture and/or instruction set. For example, some of the cores 802A-N may be in order while others are out-of-order. As another example, two or more of the cores 802A-N may be capable of execution the same instruction set, while others may be capable of executing only a subset of that instruction set or a different instruction set.

The processor may be a general-purpose processor, such as a Core™ i3, i5, i7, 2 Duo and Quad, Xeon™, Itanium™ XScale™ or StrongARM™ processor, which are available from Intel Corporation, of Santa Clara, Calif. Alternatively, the processor may be from another company, such as ARM Holdings, Ltd, MIPS, etc. The processor may be a special-purpose processor, such as, for example, a network or communication processor, compression engine, graphics processor, co-processor, embedded processor, or the like. The processor may be implemented on one or more chips. The processor 800 may be a part of and/or may be implemented on one or more substrates using any of a number of process technologies, such as, for example, BiCMOS, CMOS, or NMOS.

Figure 9:
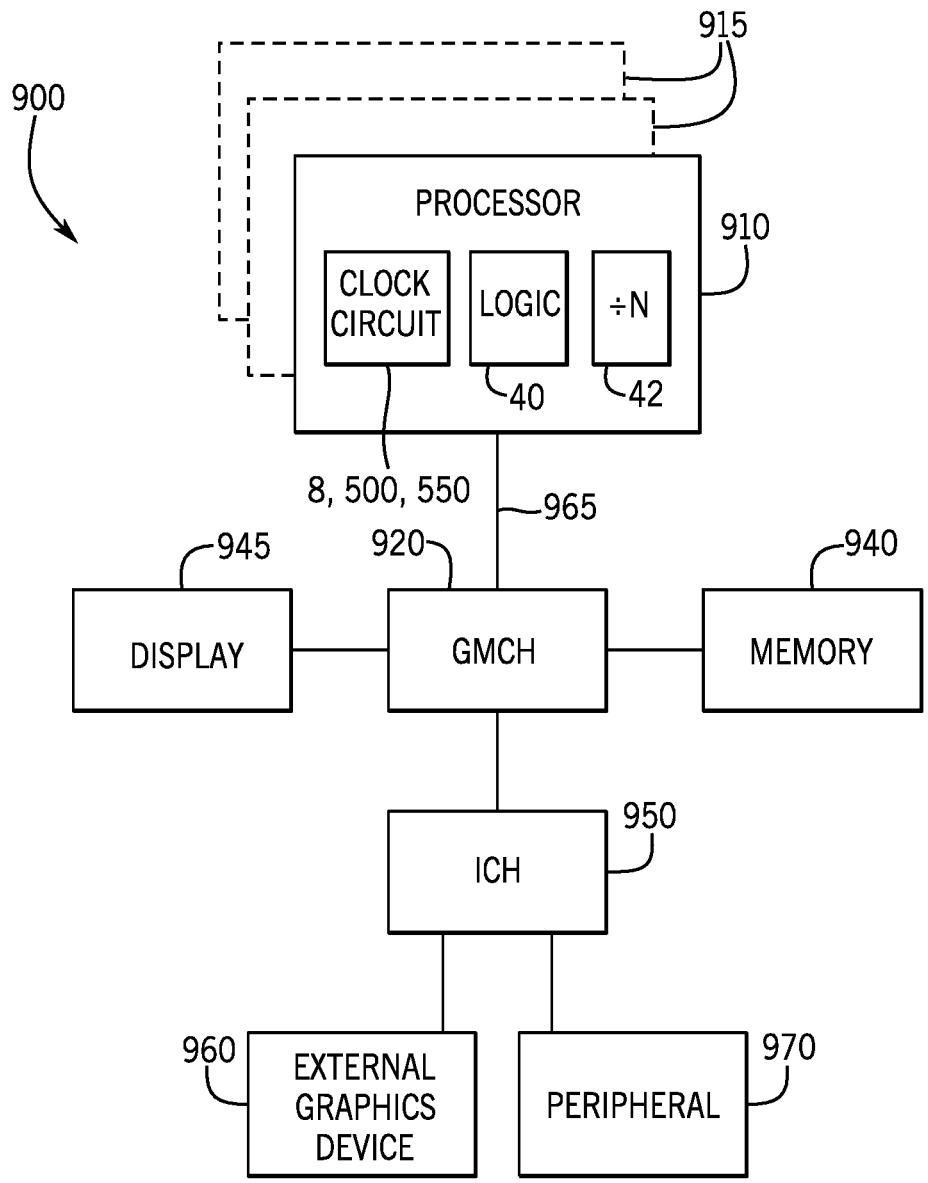
FIGS. 9, 10, 11 and 13 are block diagrams of computer systems according to example implementations.
Figure 10:
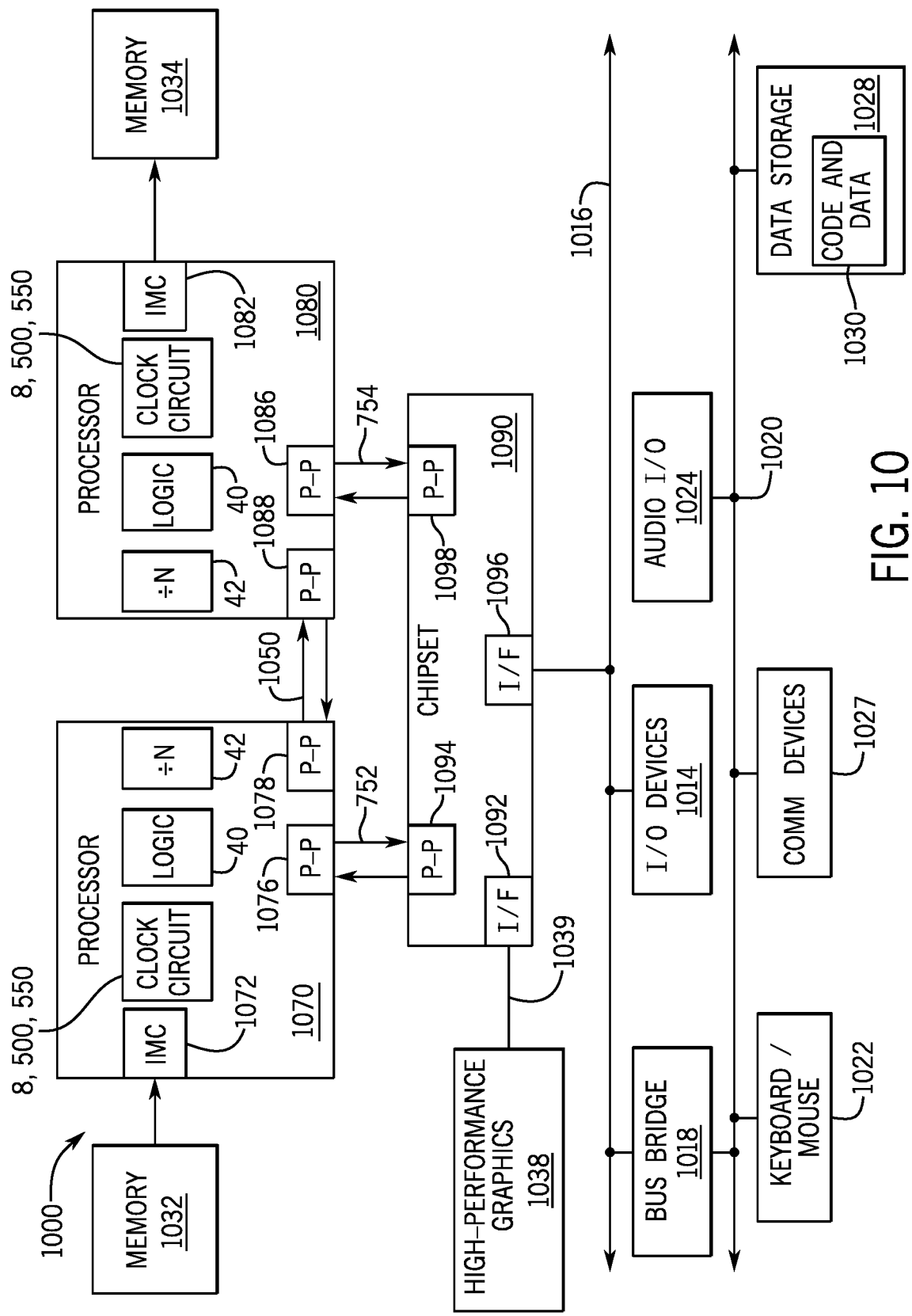
Figure 11:
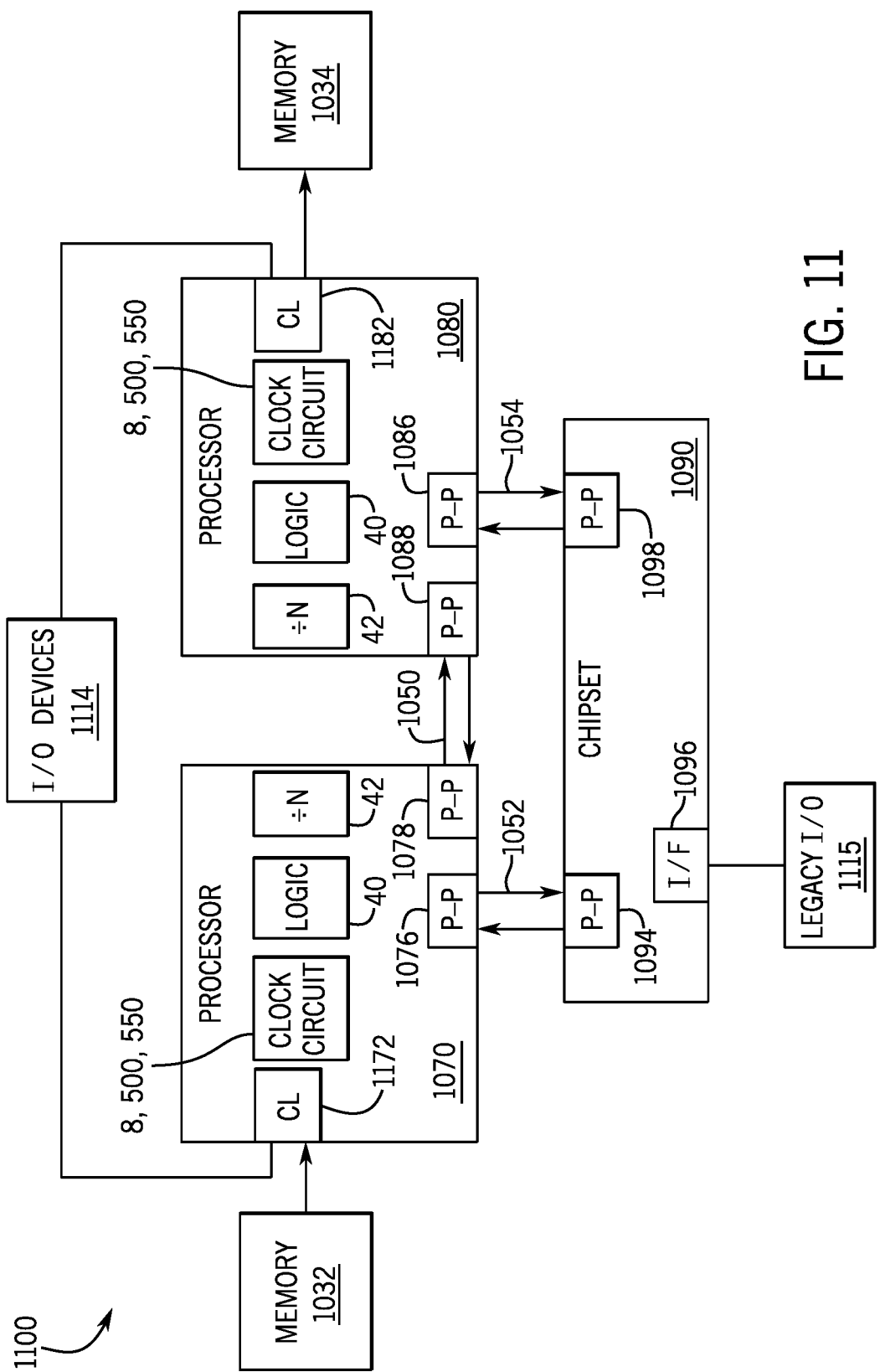
Figure 12:
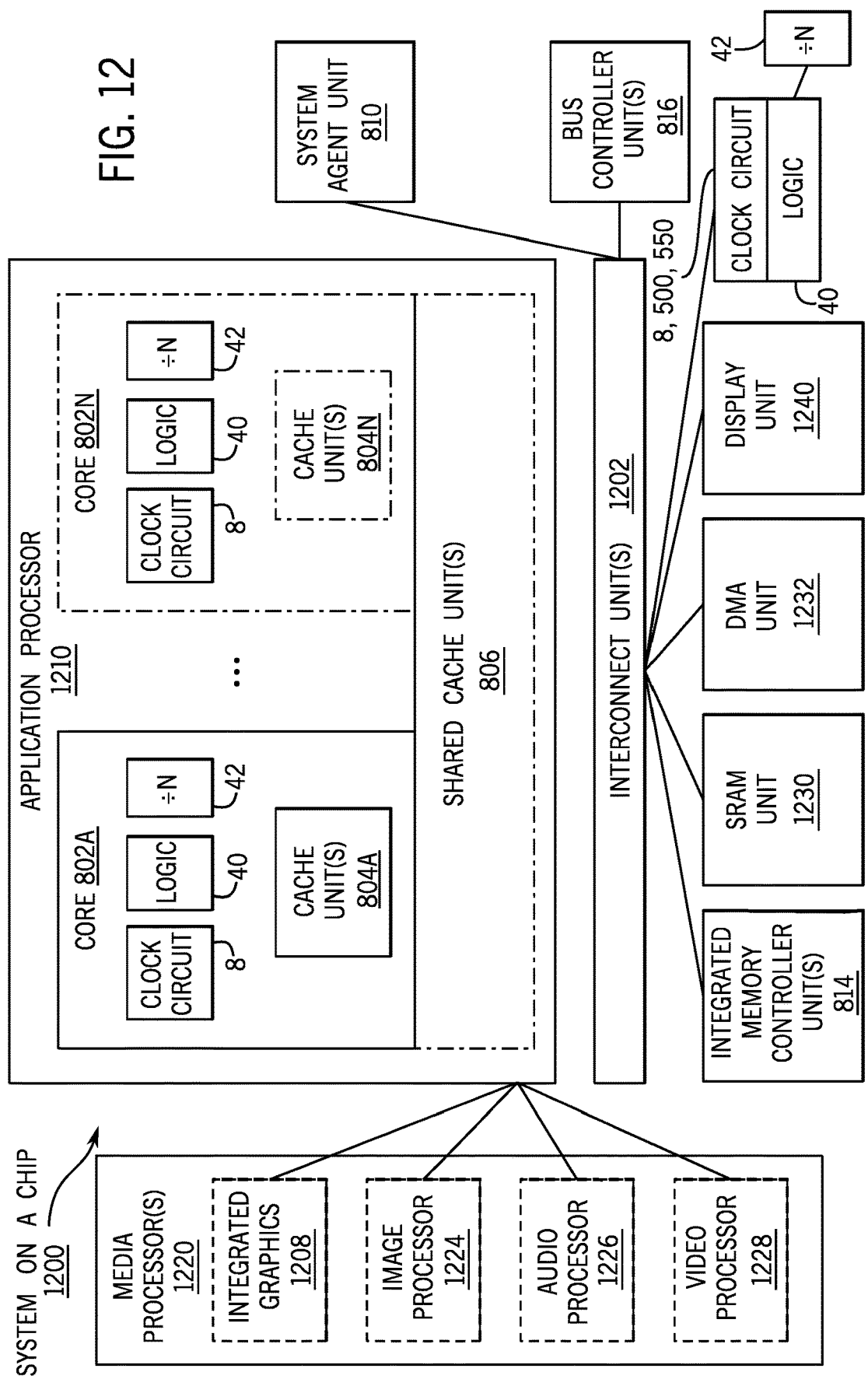
FIG. 12 is a block diagram of a system-on-a-chip according to an example implementation.

FIGS. 9-11 are exemplary systems suitable for including the processor 800, while FIG. 12 is an exemplary system on a chip (SoC) that may include one or more of the cores 802. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 9, shown is a block diagram of a system 900 in accordance with one example implementation. The system 900 may include one or more processors 910, 915, which are coupled to graphics memory controller hub (GMCH) 920. The optional nature of additional processors 915 is denoted in FIG. 9 with broken lines. As depicted in FIG. 9, one or more of the processors 910 and 915 may include the clock circuit 8, 500, 550; the logic 40 and the frequency divider 42.

Each processor 910, 915 may be some version of the processor 800. However, it should be noted that it is unlikely that integrated graphics logic and integrated memory control units would exist in the processors 910, 915. FIG. 9 illustrates that the GMCH 920 may be coupled to a memory 940 that may be, for example, a dynamic random access memory (DRAM). The DRAM may, for at least one implementation, be associated with a non-volatile cache.

The GMCH 920 may be a chipset, or a portion of a chipset. The GMCH 920 may communicate with the processor(s) 910, 915 and control interaction between the processor(s) 910, 915 and memory 940. The GMCH 920 may also act as an accelerated bus interface between the processor(s) 910, 915 and other elements of the system 900. For at least one implementation, the GMCH 920 communicates with the processor(s) 910, 915 via a multi-drop bus, such as a frontside bus (FSB) 995.

Furthermore, GMCH 920 is coupled to a display 945 (such as a flat panel display). GMCH 920 may include an integrated graphics accelerator. GMCH 920 is further coupled to an input/output (I/O) controller hub (ICH) 950, which may be used to couple various peripheral devices to system 900. Shown for example in the implementation of FIG. 9 is an external graphics device 960, which may be a discrete graphics device coupled to ICH 950, along with another peripheral device 970.

Alternatively, additional or different processors may also be present in the system 900. For example, additional processor(s) 915 may include additional processors(s) that are the same as processor 910, additional processor(s) that are heterogeneous or asymmetric to processor 910, accelerators (such as, e.g., graphics accelerators or digital signal processing (DSP) units), field programmable gate arrays, or any other processor. There can be a variety of differences between the physical resources 910, 915 in terms of a spectrum of metrics of merit including architectural, microarchitectural, thermal, power consumption characteristics, and the like. These differences may effectively manifest themselves as asymmetry and heterogeneity amongst the processors 910, 915. For at least one implementation, the various processors 910, 915 may reside in the same die package.

Referring now to FIG. 10, shown is a block diagram of a second system 1000 in accordance with an example implementation. As shown in FIG. 10, multiprocessor system 1000 is a point-to-point interconnect system, and includes a first processor 1070 and a second processor 1080 coupled via a point-to-point interconnect 1050. Each of processors 1070 and 1080 may be some version of the processor 800 as one or more of the processors 910, 915. As depicted in FIG. 10, the processor 1070 and/or processor 1080 may include the clock circuit 8, 500, 550; the frequency divider 42; and the logic 40.

While shown with only two processors 1070, 1080, it is to be understood that the scope of the present invention is not so limited. In other implementations, one or more additional processors may be present in a given processor.

Processors 1070 and 1080 are shown including integrated memory controller units 1072 and 1082, respectively. Processor 1070 also includes as part of its bus controller units point-to-point (P-P) interfaces 1076 and 1078; similarly, second processor 1080 includes P-P interfaces 1086 and 1088. Processors 1070, 1080 may exchange information via a point-to-point (P-P) interface 1050 using P-P interface circuits 1078, 1088. As shown in FIG. 10, IMCs 1072 and 1082 couple the processors to respective memories, namely a memory 1032 and a memory 1034, which may be portions of main memory locally attached to the respective processors.

Processors 1070, 1080 may each exchange information with a chipset 1090 via individual P-P interfaces 1052, 1054 using point to point interface circuits 1076, 1094, 1086, 1098. Chipset 1090 may also exchange information with a high-performance graphics circuit 1038 via a high-performance graphics interface 1039.

A shared cache (not shown) may be included in either processor or outside of both processors, yet connected with the processors via P-P interconnect, such that either or both processors' local cache information may be stored in the shared cache if a processor is placed into a low power mode.

Chipset 1090 may be coupled to a first bus 1016 via an interface 1096. In one implementation, first bus 1016 may be a Peripheral Component Interconnect (PCI) bus, or a bus such as a PCI Express bus or another third generation I/O interconnect bus, although the scope of the present invention is not so limited.

As shown in FIG. 10, various I/O devices 1014 may be coupled to first bus 1016, along with a bus bridge 1018 which couples first bus 1016 to a second bus 1020. In one implementation, second bus 1020 may be a low pin count (LPC) bus. Various devices may be coupled to second bus 1020 including, for example, a keyboard and/or mouse 1022, communication devices 1027 and a storage unit 1028 such as a disk drive or other mass storage device which may include instructions/code and data 1030, in one implementation. Further, an audio I/O 1024 may be coupled to second bus 1020. Note that other architectures are possible. For example, instead of the point-to-point architecture of FIG. 10, a system may implement a multi-drop bus or other such architecture.

Referring now to FIG. 11, shown is a block diagram of a third system 1100 in accordance with an example implementation. Like elements in FIGS. 10 and 11 bear like reference numerals, and certain aspects of FIG. 10 have been omitted from FIG. 10 in order to avoid obscuring other aspects of FIG. 11.

FIG. 11 illustrates that the processors 1070, 1080 may include integrated memory and I/O control logic ("CL") 1172 and 1182, respectively. For at least one implementation, the CL 1172, 1182 may include integrated memory controller units such as that described above in connection with FIGS. 8 and 10. In addition. CL 1172, 1182 may also include I/O control logic. FIG. 11 illustrates that not only are the memories 1032 and 1034 coupled to the CL 1172, 1182, but also that I/O devices 1114 are also coupled to the control logic 1172, 1182. Legacy I/O devices 1115 are coupled to the chipset 1190.

Referring now to FIG. 12, shown is a block diagram of a SoC 1200 in accordance with an example implementation. Similar elements in FIG. 8 bear like reference numerals. Also, dashed lined boxes are optional features on more advanced SoCs. In FIG. 12, an interconnect unit(s) 1202 is coupled to: an application processor 1210, which includes a set of one or more cores 802A-N and shared cache unit(s) 806; a system agent unit 810; a bus controller unit(s) 816; an integrated memory controller unit(s) 814; a set or one or more media processors 1220, which may include integrated graphics logic 1208, an image processor 1224 for providing still and/or video camera functionality, an audio processor 1226 for providing hardware audio acceleration, and a video processor 1228 for providing video encode/decode acceleration; a static random access memory (SRAM) unit 1230; a direct memory access (DMA) unit 1232; and a display unit 1240 for coupling to one or more external displays. Moreover, as depicted in FIG. 12, the SoC 1200 includes the clock circuit 8, 500, 550; frequency divider 42; and logic 40.

Figure 13:
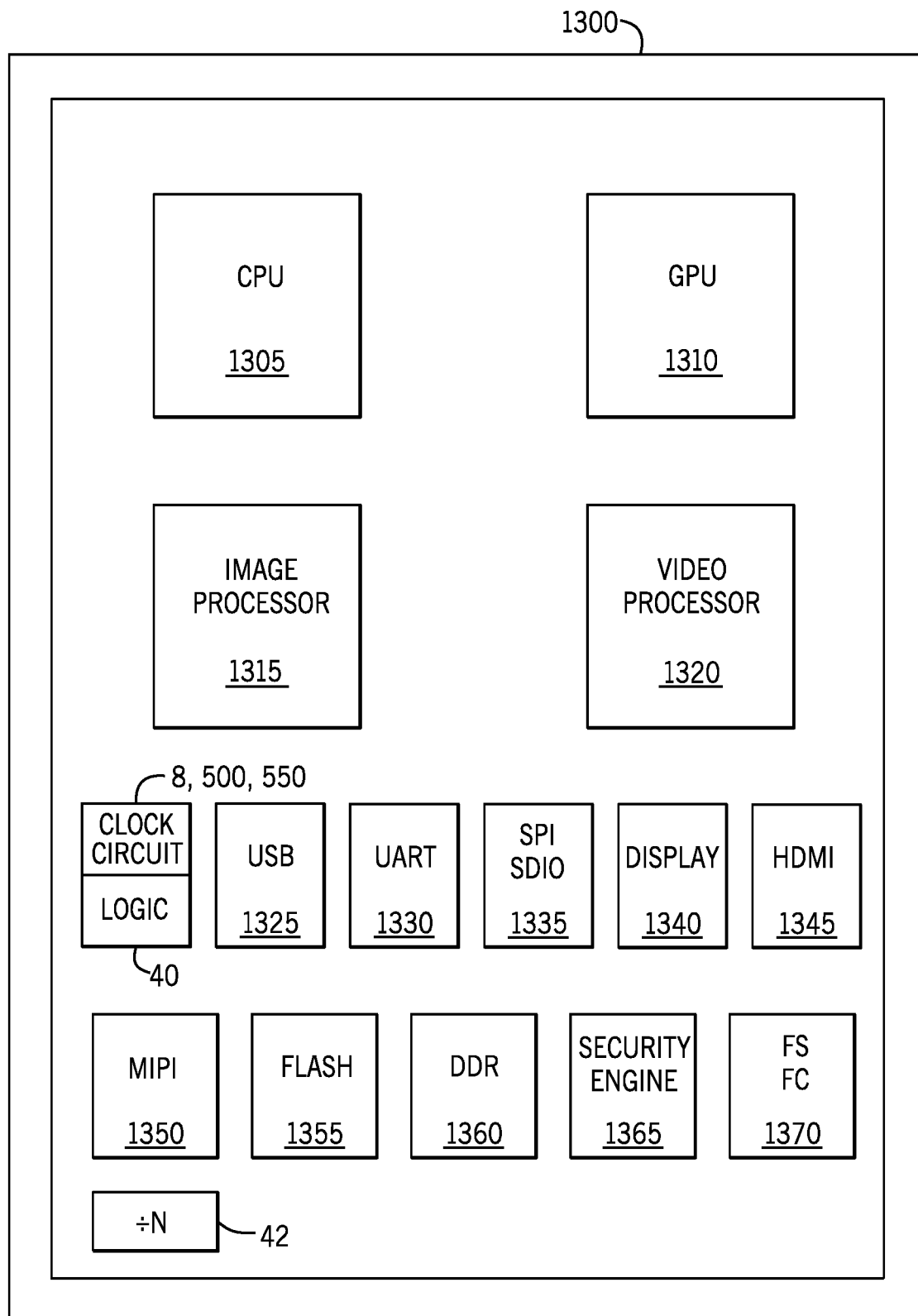

FIG. 13 illustrates a processor 1300 containing a central processing unit (CPU) and a graphics processing unit (GPU), which may perform at least one instruction according to one implementation. In one implementation, an instruction to perform operations according to at least one implementation could be performed by the CPU. In another implementation, the instruction could be performed by the GPU. In still another implementation, the instruction may be performed through a combination of operations performed by the GPU and the CPU. For example, in one implementation, an instruction in accordance with one implementation may be received and decoded for execution on the GPU. However, one or more operations within the decoded instruction may be performed by a CPU and the result returned to the GPU for final retirement of the instruction. Conversely, in some implementations, the CPU may act as the primary processor and the GPU as the co-processor.

In some implementations, instructions that benefit from highly parallel, throughput processors may be performed by the GPU, while instructions that benefit from the performance of processors that benefit from deeply pipelined architectures may be performed by the CPU. For example, graphics, scientific applications, financial applications and other parallel workloads may benefit from the performance of the GPU and be executed accordingly, whereas more sequential applications, such as operating system kernel or application code may be better suited for the CPU.

The processor 1300 includes a CPU 1005, GPU 1310, image processor 1315, video processor 1320, USB controller 1325, UART controller 1330, SPI/SDIO controller 1335, display device 1340, memory interface controller 1345, MIPI controller 1350, flash memory controller 1355, dual data rate (DDR) controller 1360, security engine 1365, and I2S/I2C controller 1370. The processor 1300 further includes the frequency divider 42; the clock circuit 8, 500, 550; and the logic 40. Other logic and circuits may be included in the processor of FIG. 13, including more CPUs or GPUs and other peripheral interface controllers.

One or more aspects of at least one implementation may be implemented by representative data stored on a machine-readable medium which represents various logic within the processor, which when read by a machine causes the machine to fabricate logic to perform the techniques described herein. Such representations, known as "IP cores" may be stored on a tangible, machine readable medium ("tape") and supplied to various customers or manufacturing facilities to load into the fabrication machines that actually make the logic or processor. For example, IP cores, such as the Cortex™ family of processors developed by ARM Holdings, Ltd. and Loongson IP cores developed the Institute of Computing Technology (ICT) of the Chinese Academy of Sciences may be licensed or sold to various customers or licensees, such as Texas Instruments, Qualcomm, Apple, or Samsung and implemented in processors produced by these customers or licensees.

Figure 14:
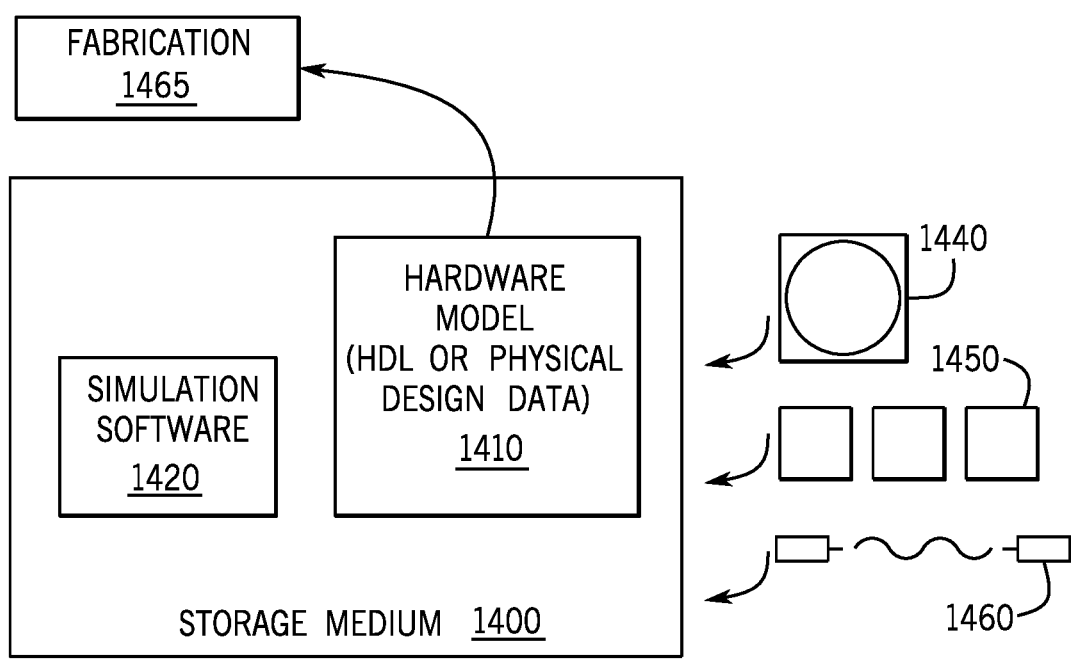
FIG. 14 is a block diagram of an integrated circuit development system according to an example implementation.

FIG. 14 shows a block diagram illustrating the development of IP cores according to one implementation. Storage 1430 includes simulation software 1420 and/or hardware or software model 1410. In one implementation, the data representing the IP core design can be provided to the storage 1430 via memory 1440 (e.g., hard disk), wired connection (e.g., internet) 1450 or wireless connection 1460. The IP core information generated by the simulation tool and model can then be transmitted to a fabrication facility where it can be fabricated by a 3rd party to perform at least one instruction in accordance with at least one implementation.

Implementations of the mechanisms disclosed herein may be implemented in hardware, software, firmware, or a combination of such implementation approaches. Implementations of the invention may be implemented as computer programs or program code executing on programmable systems comprising at least one processor, a storage system (including volatile and non-volatile memory and/or storage elements), at least one input device, and at least one output device.

Program code may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Accordingly, implementations of the invention also include non-transitory, tangible machine-readable media containing instructions or containing design data, such as Hardware Description Language (HDL), which defines structures, circuits, apparatuses, processors and/or system features described herein. Such implementations may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Thus, techniques for performing one or more instructions according to at least one implementation are disclosed. While certain exemplary implementations have been described and shown in the accompanying drawings, it is to be understood that such implementations are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed implementations may be readily modifiable in arrangement and detail as facilitated by enabling technological advancements without departing from the principles of the present disclosure or the scope of the accompanying claims.

What is claimed is:

1. A processor comprising:
    a plurality of processing cores, wherein a first processing core of the plurality of processing cores provides data;
    a frequency divider to frequency divide a first clock signal associated with a first clock domain to provide a second clock signal associated with a second clock domain;
    a bus; and
    a synchronous first in first out (FIFO) buffer having a write pointer, a write port associated with the first clock domain, and a read port associated with the second clock domain to communicate the data between the first and second clock domains, wherein the synchronous FIFO buffer is to:
        apply value change compression to remove duplicate data values from the data provided by the first processing core; and
        control incrementing the write pointer to control the value change compression based at least in part on whether a status of connections of a plurality of sources of data to the bus changes.

2. The processor of claim 1, further comprising:
    a generator synchronous to the second clock domain, wherein the first processing core provides the data to the generator to cause the generator to provide data for the processor; and
    another synchronous FIFO buffer to communicate the data provided by the generator from the second clock domain to the first clock domain.

3. The processor of claim 1, wherein the synchronous FIFO buffer is to further control incrementing the write pointer to control the value change compression based at least in part on whether time successive values provided by the plurality of processing cores are duplicates.

4. The processor of claim 1, further comprising:
    a generator synchronous to the second clock domain, wherein at least one processing core of the plurality of processing cores is associated with a source of the plurality of sources of data to be processed by the generator.

5. The processor of claim 1, wherein:
    the data is associated with an availability signal; and
    the synchronous FIFO buffer is to further control incrementing the write pointer to control the value change compression based at least in part on whether the data changes while the availability signal remains asserted.

6. The processor of claim 1, wherein the synchronous FIFO buffer comprises a recycling circuit to retain and provide a last valid data value for the synchronous FIFO buffer when the synchronous FIFO buffer is empty.

7. The processor of claim 1, further comprising:
a digital random number generator synchronous to the second clock domain to provide a random value for a processing core of the plurality of processing cores.

8. A method comprising:
in a processor, generating data associated with an undivided clock domain for processing by logic of the processor within a divided clock domain, wherein the processor is associated with a source of a plurality of sources of data, and the plurality of sources are coupled to an interconnect in a multiplexed fashion; and
communicating between the divided clock domain and the undivided clock domain, comprising using a synchronous first in first out (FIFO) buffer to regulate transfer of the data from the divided clock domain to the undivided clock domain, wherein the communicating comprises applying value change compression to remove duplicate data values from the data, and controlling incrementing a write pointer of the synchronous FIFO buffer to control the value change compression based at least in part on the multiplexing of the plurality of sources.

9. The method of claim 8, wherein:
the communicating further comprises communicating the data over the interconnect using a data available signal; and
applying value change compression comprises discarding at least one duplicate value communicated over the interconnect while the data available signal remains active.

10. The method of claim 8, wherein the communicating further comprises holding a last valid data value for the FIFO in response to the FIFO being empty.

11. The method of claim 8, wherein the communicating further comprises communicating with a digital random number generator module of the processor.

12. A system comprising:
an interconnect
at least one processing core to provide data, wherein the at least one processor core is associated with a source of a plurality of sources of data, and the plurality of sources are coupled to the interconnect in a multiplexed fashion;
a peripheral, wherein the processing core is associated with a first clock domain and the peripheral is associated with a second clock domain different from the first clock domain; and
at least one synchronous first in first out (FIFO) buffer coupled to the peripheral and the interconnect to communicate the data between the first and second clock domains, wherein the at least one synchronous FIFO buffer is to apply value change compression to remove duplicate data values from the data provided by the at least one processing core, and control incrementing a write pointer to control the value change compression based at least in part on the multiplexing of the plurality of sources.

13. The system of claim 12, wherein the peripheral comprises a digital random number generator to provide at least one random number in response to a request from at the least one processing core.

14. The system of claim 12,
wherein the at least one synchronous FIFO buffer further comprises:
a first synchronous FIFO buffer to regulate communication of data from the interconnect to the peripheral; and
a second synchronous FIFO buffer to regulate communication of data from the peripheral to the interconnect.

15. The system of claim 12, wherein the at least one synchronous FIFO buffer is to further control incrementing the write pointer to control the value change compression based at least in part on whether time successive values provided by the at least one processor core are duplicates.

* * * * *